(12) United States Patent
Nakagawa et al.

(10) Patent No.: US 12,307,881 B2
(45) Date of Patent: May 20, 2025

(54) NOTIFICATION CONTROL DEVICE, NOTIFICATION CONTROL METHOD, AND NOTIFICATION SYSTEM

(71) Applicant: SONY GROUP CORPORATION, Tokyo (JP)

(72) Inventors: Ayumi Nakagawa, Tokyo (JP); Takeshi Ogita, Tokyo (JP); Osamu Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 90 days.

(21) Appl. No.: 18/004,199

(22) PCT Filed: Jun. 22, 2021

(86) PCT No.: PCT/JP2021/023608
§ 371 (c)(1),
(2) Date: Jan. 4, 2023

(87) PCT Pub. No.: WO2022/014274
PCT Pub. Date: Jan. 20, 2022

(65) Prior Publication Data
US 2023/0267812 A1    Aug. 24, 2023

(30) Foreign Application Priority Data
Jul. 14, 2020    (JP) ................. 2020-120698

(51) Int. Cl.
*G08B 6/00*    (2006.01)
(52) U.S. Cl.
CPC .................... *G08B 6/00* (2013.01)

(58) Field of Classification Search
CPC ........................................................ G06B 6/00
USPC .................................................... 340/540
See application file for complete search history.

(56) References Cited

U.S. PATENT DOCUMENTS

| | | | |
|---|---|---|---|
| 11,451,897 B1* | 9/2022 | Chinnapalli | H04W 24/08 |
| 2010/0111328 A1* | 5/2010 | Yu | H03G 3/32 |
| | | | 381/107 |
| 2012/0229276 A1* | 9/2012 | Ronkainen | H04M 1/72454 |
| | | | 340/540 |
| 2014/0171132 A1 | 6/2014 | Ziemianska | |
| 2016/0241706 A1* | 8/2016 | Ziemianska | H04M 3/436 |
| 2021/0334645 A1* | 10/2021 | Pardeshi | G10L 25/51 |

FOREIGN PATENT DOCUMENTS

| | | |
|---|---|---|
| CN | 108140284 A | 6/2018 |
| CN | 108694821 A | 10/2018 |
| CN | 210927936 U | 7/2020 |

(Continued)

OTHER PUBLICATIONS

International Search Report and Written Opinion of PCT Application No. PCT/JP2021/023608, issued on Aug. 31, 2021, 11 pages of ISRWO.

*Primary Examiner* — Jack K Wang
(74) *Attorney, Agent, or Firm* — CHIP LAW GROUP

(57) ABSTRACT

A notification control device according to the present technology includes a control unit that controls a notification mode by a notification device that performs a notification of detection of an environmental sound, on a basis of an arrangement state of the notification device or a state of a user of the notification device.

15 Claims, 10 Drawing Sheets

(56) References Cited

FOREIGN PATENT DOCUMENTS

| | | |
|---|---|---|
| JP | 10-200933 A | 7/1998 |
| JP | 2008-146155 A | 6/2008 |
| JP | 5564636 B1 | 7/2014 |
| JP | 2014-192781 A | 10/2014 |
| JP | 2015-101332 A | 6/2015 |
| JP | 2016-032221 A | 3/2016 |
| JP | 2016-170405 A | 9/2016 |
| JP | 2017-158005 A | 9/2017 |
| JP | 2020-013369 A | 1/2020 |

* cited by examiner

NOTIFICATION CONTROL DEVICE, NOTIFICATION CONTROL METHOD, AND NOTIFICATION SYSTEM

CROSS REFERENCE TO RELATED APPLICATIONS

This application is a U.S. National Phase of International Patent Application No. PCT/JP2021/023608 filed on Jun. 22, 2021, which claims priority benefit of Japanese Patent Application No. JP 2020-120698 filed in the Japan Patent Office on Jul. 14, 2020. Each of the above-referenced applications is hereby incorporated herein by reference in its entirety.

TECHNICAL FIELD

The present technology relates to a technical field of a notification control device and a notification control method which control a notification mode by a notification device that performs a notification of detection of an environmental sound, and a notification system including the notification control device and the notification device.

BACKGROUND ART

There is a notification device that performs various notifications to a user. For example, Patent Document 1 and Patent Document 2 below disclose that a mobile phone performs a notification of an incoming call to a user.

CITATION LIST

Patent Document

Patent Document 1: Japanese Patent Application Laid-Open No. 2008-146155
Patent Document 2: Japanese Patent Application Laid-Open No. 10-200933

SUMMARY OF THE INVENTION

Problems to be Solved by the Invention

Here, as a notification system that performs various notifications to the user, for example, it is conceivable to construct a system in which a notification sound emitted by a home appliance such as an interphone, a rice cooker, or a washing machine in an environment such as a house is detected as an environmental sound, and a notification device such as a smartphone notifies that the environmental sound is detected to the user.

In a case where such a notification system is assumed, an arrangement state of the notification device can be different, for example, the notification device is being held by the user, is arranged on a stationary object such as a sofa, a bed, or a desk, or is arranged in a noisy room where a vacuum cleaner is used. Furthermore, the state of the user can also be different, for example, the user has hearing loss due to an elderly person or the like, is listening to music using headphones or the like, and the like.

On the other hand, for example, in a case where the notification mode by the notification device is a fixed mode such as only sound or only vibration, the user may not notice the notification. For example, in a case where a notification is made by vibration in a state where the notification device is arranged on a sofa or the like, it is difficult for the user to notice the notification.

The present technology has been made in view of the circumstances described above, and an object of the present technology is to improve reliability of a system that notifies that an environmental sound is detected to the user, by increasing the possibility that the user notices the notification.

Solutions to Problems

A notification control device according to the present technology includes a control unit that controls a notification mode by a notification device that performs a notification of detection of an environmental sound, on a basis of an arrangement state of the notification device or a state of a user of the notification device.

Therefore, for example, the notification mode by the notification device is controlled on the basis of the arrangement state of the notification device, such as a state in which the notification device is arranged on the immovable object such as a sofa, or a state in which the notification device is arranged in a noisy room where a vacuum cleaner is used, or the state of the user, such as a state in which the user has hearing loss or is listening to music using headphones or the like, and thus it is possible to increase the possibility that the user notices the notification.

In the notification control device according to the present technology described above, it is considered that the control unit is configured to control the notification mode on the basis of the arrangement state of the notification device with respect to the user.

Therefore, it is possible to appropriately control the notification mode according to the arrangement state of the notification device with respect to the user, such as a state in which the notification device is being held by the user or is in the pocket.

In the notification control device according to the present technology described above, it is considered that the control unit is configured to control such that the notification mode is different between a case where the notification device is arranged in contact with the user and a case where the notification device is not arranged in contact with the user.

Therefore, it is possible to appropriately control the notification mode on the basis of whether or not the notification device is arranged in contact with the user, for example, in a case where the notification device is being held by the user or is in the pocket.

In the notification control device according to the present technology described above, it is considered that the control unit is configured to control such that a notification is performed in different modes between a case where the notification device is arranged on an immovable object and a case where the notification device is not arranged on the immovable object.

The immovable object here means an object that does not move by itself, and examples of the immovable object include furniture such as a sofa, a bed, a desk, a table, and a chair in an indoor example such as a house. With the configuration described above, the notification mode can be appropriately controlled on the basis of whether or not the notification device is arranged on such an immovable object.

In the notification control device according to the present technology described above, it is considered that the control unit is configured to control such that a notification is performed in different modes between a case where the notification device is arranged at a position on a specific ear side of either a left or right ear of the user and a case where the notification device is not arranged at the position on the specific ear side of either the left or right ear of the user.

Therefore, it is possible to control the notification mode on the basis of whether or not the notification device is arranged at a position on the ear side where it is difficult for the user to hear, in response to a situation where only one ear is difficult to hear, for example, in a case where the user has hearing loss of one ear, in a case where only one ear is wearing an earphone, or the like.

In the notification control device according to the present technology described above, it is considered that, regarding a notification by tactile stimulation, the control unit is configured to control such that a notification indicating only that the environmental sound has been detected and a notification indicating a type of the detected sound are performed for detection of one environmental sound.

Regarding the notification by tactile stimulation, for the notification indicating the type of the detected sound, there is a tendency to select a tactile stimulation pattern having a relatively high resolution in order to improve discriminability of the sound type by the user, and therefore, it is difficult to select a tactile stimulation pattern having a low resolution, which is easily noticed by the user. Therefore, as described above, by separately performing the notification indicating only that the environmental sound has been detected and the notification indicating the type of the detected sound, it is possible to perform a notification of a pattern which is specialized only for the notification of detection and is easily noticed, and then perform a notification by a pattern having a high resolution for discriminating the sound type.

In the notification control device according to the present technology described above, it is considered that there is a plurality of the notification devices, and the control unit selects the notification device to perform a notification according to a type of the detected environmental sound.

Therefore, it is possible to cause the notification device of the user, which is considered to be appropriate as the notification destination from the type of the detected environmental sound, to execute the notification.

In the notification control device according to the present technology described above, it is considered that there is a plurality of the notification devices, and the control unit is configured to select the notification device to perform a notification according to a distance from an estimated sound source position of the detected environmental sound.

Therefore, for example, it is possible to cause the notification device of the user, which is considered to be appropriate in terms of ease of coping with the event indicated by the environmental sound, to execute the notification, such as performing the notification to the user located at a short distance to such an extent that the event indicated by the environmental sound, such as an event of rice cooking completion indicated by the notification sound of the rice cooker, can be coped with, for example.

In the notification control device according to the present technology described above, it is considered that the control unit is configured to control the notification mode according to urgency of the detected environmental sound.

The urgency of the environmental sound is an index representing how quickly the user should cope with the event indicated by the environmental sound in a case where the environmental sound is generated. By controlling the notification mode according to the urgency of such an environmental sound, it is possible to perform a notification by an appropriate mode according to the urgency.

In the notification control device according to the present technology described above, it is considered that the control unit is configured to control a delay time from detection to a notification of the environmental sound according to the urgency.

Therefore, for example, in a case where the urgency is high, it is possible to control the delay time to be shorter than in a case where the urgency is low, and it is possible to prevent the notification for the environmental sound with the low urgency from being given priority in terms of timing over the notification for the environmental sound with the high urgency.

In the notification control device according to the present technology described above, it is considered that, regarding a notification by tactile stimulation, the control unit is configured to control such that a notification is performed in a low vibration period during walking in a case where the notification device is arranged in contact with the user who is walking.

Here, the low vibration period means a period excluding a period in which relatively large vibration is generated in the vicinity of the foot landing timing during walking. In a case where the notification device arranged in contact with the walking user performs a notification by tactile stimulation, it is possible to increase the possibility that the user notices the notification by performing the notification in such a low vibration period.

In the notification control device according to the present technology described above, it is considered that the control unit is configured to control the notification mode on the basis of information as to whether or not the user has a hearing impairment.

Therefore, for example, in a case where the user has a hearing impairment such as hearing loss or hyperacusis, it is possible to perform the notification by an appropriate mode according to the presence or absence of the hearing impairment of the user, such as performing the notification by tactile stimulation or visual notification instead of sound.

A notification control method according to the present technology is a notification control method that controls a notification mode by a notification device that performs a notification of detection of an environmental sound, on a basis of an arrangement state of the notification device or a state of a user of the notification device.

Even with such a notification control method, it is possible to obtain actions similar to those of the notification control device according to the present technology described above.

Furthermore, a notification system according to the present technology is a notification system in which a notification device performs a notification that a notification control device has detected an environmental sound, and includes a detection unit that is provided in the notification control device, and detects the environmental sound; a recognition unit that recognizes an arrangement state of the notification device or a state of a user of the notification device; and a control unit that is provided in the notification control device, and controls a notification mode by the notification device on a basis of the arrangement state of the notification device or the state of the user recognized by the recognition unit.

Even with such a notification system, it is possible to obtain actions similar to those of the notification control device according to the present technology described above.

In the notification system according to the present technology described above, it is considered that there is a plurality of the notification devices, and the control unit is configured to select the notification device to perform the notification according to a type of the environmental sound detected by the detection unit.

Therefore, it is possible to cause the notification device of the user, which is considered to be appropriate as the notification destination from the type of the detected environmental sound, to execute the notification.

MODE FOR CARRYING OUT THE INVENTION

Hereinafter, embodiments will be described in the following order.
<1. First Embodiment>
 [1-1. Configuration of notification system as first embodiment]
 [1-2. Control example]
 [1-3. Processing procedure]
 [1-4. Regarding notification indicating type of environmental sound]
<2. Second Embodiment>
<3. Third Embodiment>
<4. Fourth Embodiment>
<5. Fifth Embodiment>
<6. Modification>
<7. Summary of embodiments>
<8. Present technology>

1. First Embodiment

[1-1. Configuration of Notification System as First Embodiment]

Figure 1:
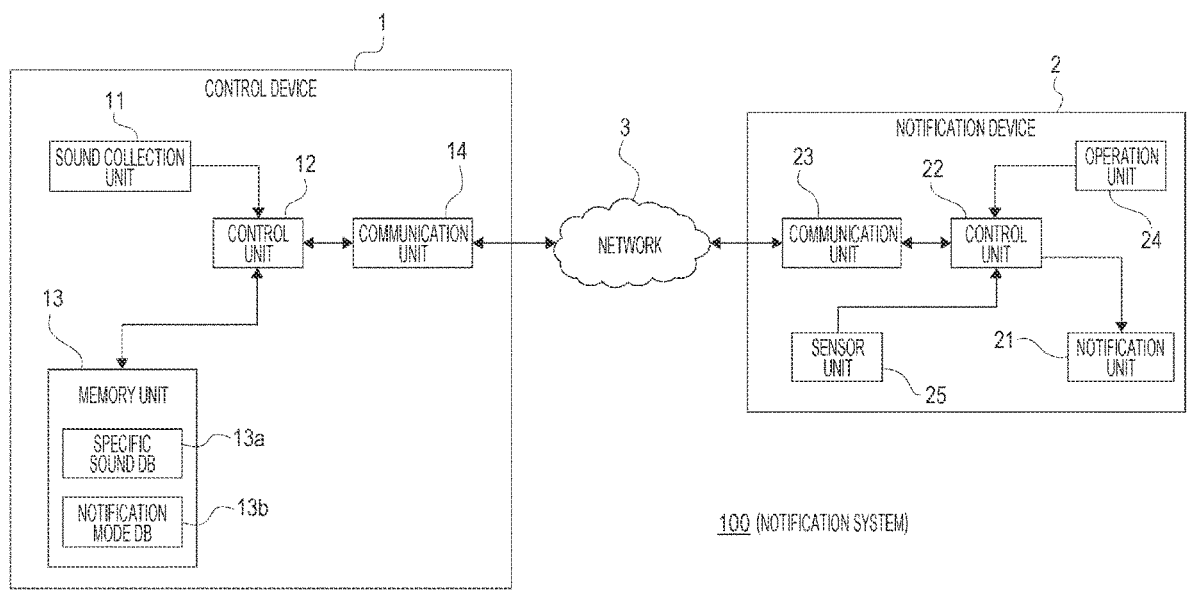
FIG. 1 is a block diagram illustrating a configuration example of a notification system as a first embodiment.

FIG. 1 is a block diagram illustrating a configuration example of a notification system 100 as a first embodiment according to the present technology.

As illustrated, the notification system 100 includes at least a control device 1 and a notification device 2. In the present example, the notification system 100 is a system applied to an indoor environment such as a house. The control device 1 is, for example, a device that is arranged in a living room or the like in a house, detects and analyzes an environmental sound, and causes the notification device 2 to notify that a specific environmental sound has been detected to a user.

The control device 1 includes a sound collection unit 11, a control unit 12, a memory unit 13, and a communication unit 14.

The sound collection unit 11 includes one or a plurality of microphones, and collects an environmental sound generated outside the control device 1. In the present example, the sound collection unit 11 is provided with a microphone array including a plurality of microphones arranged to face different directions. Therefore, in a case where an environmental sound is generated, it is possible to specify in which direction the sound source is located. Furthermore, the position of the sound source can be estimated.

The control unit 12 includes, for example, a microcomputer including a central processing unit (CPU), a read only memory (ROM), and a random access memory (RAM), and performs control for realizing various calculations and various operations of the control device 1 by the CPU described above executing processing according to a program stored in, for example, the ROM or the like.

The memory unit 13 includes, for example, a semiconductor storage device such as a flash memory or a nonvolatile storage device such as a hard disk drive (HDD), and stores various kinds of data used for the processing by the control unit 12. The memory unit 13 stores information as a specific sound database (DB) 13*a*. The specific sound DB 13*a* is a DB that stores data for voice analysis for each type of specific sounds (hereinafter, described as "specific sound") set as sounds that require notification to the user in the notification system 100, such as sounds of interphones and notification sounds emitted by home appliances such as rice cookers and washing machines, for example.

The control unit 12 monitors a sound collection signal from the sound collection unit 11, and in a case where an environmental sound is generated, the control unit 12 performs voice analysis with reference to data for voice analysis in the specific sound DB 13*a* to determine whether or not the generated environmental sound is the specific sound and determine the type of sound of the specific sound.

Furthermore, the memory unit 13 also stores information as a notification mode DB 13*b*. The notification mode DB 13*b* stores information in which information (hereinafter, described as "arrangement state type information") indicating the type of the arrangement state of the notification device 2 and notification mode information indicating a mode of notification to be executed in correspondence with the arrangement state are associated with each other. Details will be described later again.

The communication unit 14 performs data communication with an external device. The communication unit 14 of the present example can perform data communication with an external device via a network 3.

Here, the network 3 is, for example, a communication network such as a local area network (LAN) or the Internet.

The notification device 2 includes a notification unit 21, a control unit 22, a communication unit 23, an operation unit 24, and a sensor unit 25. As a device form of the notification device 2, for example, a smartphone, a tablet terminal, or the like can be considered.

The notification unit 21 comprehensively represents a notification device that performs various notifications to the user. Examples of the notification device included in the notification unit 21 include a speaker for performing notification by sound, a lamp or a display device for performing visual notification, a tactile sense presentation device for performing notification by tactile stimulation, and the like. Here, examples of the tactile sense presentation device include a vibration device.

The control unit 22 includes, for example, a microcomputer including a CPU, a ROM, and a RAM, and performs control for realizing various calculations and various operations of the notification device 2 by the CPU described above executing processing according to a program stored in, for example, the ROM or the like.

The communication unit 23 performs data communication with an external device, and in the present example, can perform data communication with an external device via the network 3. The control unit 22 can perform data communication with the control unit 12 in the control device 1 via the communication unit 23.

The operation unit 24 comprehensively represents operation elements such as various keys, buttons, and a touch panel provided in the notification device 2, and outputs operation input information corresponding to an operation input of the user to the control unit 22. The control unit 22 executes processing according to the operation input information from the operation unit 24. Therefore, the operation of the notification device 2 according to the operation input of the user is realized.

The sensor unit 25 comprehensively represents various sensors included in the notification device 2. Examples of the sensor included in the sensor unit 25 include an image sensor, a microphone, a G sensor (acceleration sensor), a gyro sensor (angular velocity sensor), a temperature sensor, a position sensor that detects the position of the notification device 2, a proximity sensor, and an illuminance sensor.

Here, examples of the position sensor include a global navigation satellite system (GNSS) sensor, a geomagnetic sensor for geomagnetic positioning, and the like.

Note that, for the detection of the position of notification device 2, Wi-Fi positioning using radio field intensity of Wireless Fidelity (Wi-Fi: registered trademark) can also be performed.

[1-2. Control Example]

Hereinafter, a control example of the notification mode performed by the control device 1 will be described.

In the first embodiment, the notification mode is controlled according to the arrangement state of the notification device 2.

Examples of the arrangement state of the notification device 2 include a state in which the notification device 2 is arranged on an immovable object such as a sofa, a bed, a table, or a desk, a state in which the notification device 2 is arranged in contact with the user, such as being held by the user or being put in a pocket of clothing such as pants, a state in which the notification device 2 is arranged in a noise environment such as using the vacuum cleaner or listening to music emitted by a speaker, and the like. Moreover, examples of the arrangement state of the notification device 2 include a state in which the notification device 2 is at a position far from or close to the user, and a state in which the notification device 2 is arranged at a position on a specific ear side among the right ear and the left ear of the user.

Hereinafter, first to ninth examples will be given as control examples of the notification mode according to the arrangement state of the notification device 2.

First Example

In a first example, in a case where the notification device 2 is arranged on the immovable object, a notification other than tactile stimulation, specifically, a notification using a sound, a screen flash (screen blinking), or a lamp is executed.

The immovable object means an object that does not move by itself, and examples of the immovable object include furniture such as a sofa, a bed, a desk, a table, and a chair in an indoor example such as a house.

Here, whether or not the notification device 2 is arranged on the immovable object is determined by the control unit 22 in the notification device 2 on the basis of detection signals of the G sensor and the gyro sensor included in the sensor unit 25.

In this case, in a case where it is determined that the specific sound has been detected as the environmental sound, the control unit 12 in the control device 1 inquires of the notification device 2 whether or not the notification device 2 is arranged on the immovable object. As a result of the inquiry, in a case where the notification device 2 is in a state of being arranged on the immovable object, an instruction is given to the notification device 2 to execute any of the notification by emitting sound of the speaker in the notification unit 21, the notification by screen flash by the display device, or the notification by causing the lamp to emit light (including blinking).

In this case, in the notification mode DB 13b, at least information indicating a "state of being arranged on the immovable object" is stored as the arrangement state type information described above, and information indicating the notification mode of any one of the notification by emitting sound of the speaker, the notification by screen flash by the display device, or the notification by causing the lamp to emit light (including blinking) is stored in association with the arrangement state type information indicating the "state of being arranged on the immovable object". By causing the notification device 2 to execute such a notification in the notification mode instructed by the notification mode DB 13b, the control unit 12 can cause the notification device 2 to execute a notification by an appropriate mode corresponding to the "state of being arranged on the immovable object".

Second Example

In a second example, in a case where the notification device 2 is arranged in contact with the user, the notification by tactile stimulation instead of sound is executed.

Whether or not the notification device 2 is arranged in contact with the user is determined by the control unit 22 in the notification device 2 on the basis of, for example, the detection signal of the proximity sensor included in the sensor unit 25.

In this case, in a case where it is determined that the specific sound has been detected as the environmental sound, the control unit 12 in the control device 1 inquires of the notification device 2 whether or not the notification device 2 is arranged in contact with the user. As a result of the inquiry, in a case where the notification device 2 is in a state of being arranged in contact with the user, an instruction is given to the notification device 2 to execute the notification by the tactile sense presentation device in the notification unit 21.

In this case, in the notification mode DB 13b, at least information indicating a "state of being arranged in contact with the user" is stored as the arrangement state type information described above, and information indicating the notification mode as the notification (for example, the notification by vibration) by the tactile sense presentation device is stored in association with the arrangement state type information indicating the "state of being arranged in contact with the user". By causing the notification device 2 to execute such a notification in the notification mode instructed by the notification mode DB 13b, the control unit 12 can cause the notification device 2 to execute a notification by an appropriate mode corresponding to the "state of being arranged in contact with the user".

Third Example

In a third example, in a case where the notification device 2 is in a state of being arranged in the pocket of the clothing of the user, a notification by vibration is performed.

Whether or not the notification device 2 is arranged in the pocket is determined by the control unit 22 in the notification device 2 on the basis of, for example, the detection signals of the proximity sensor and the illuminance sensor included in the sensor unit 25.

In this case, in a case where it is determined that the specific sound has been detected as the environmental sound, the control unit 12 in the control device 1 inquires of the notification device 2 whether or not the notification device 2 is arranged in the pocket. As a result of the inquiry, in a case where the notification device 2 is in a state of being arranged in the pocket, an instruction is given to the notification device 2 to execute the notification (the notification by vibration) by the tactile sense presentation device in the notification unit 21.

In this case, in the notification mode DB 13b, at least information indicating a "state of being arranged in the pocket" is stored as the arrangement state type information described above, and information indicating the notification mode as the notification by vibration is stored in association with the arrangement state type information indicating the "state of being arranged in the pocket". By causing the notification device 2 to execute such a notification in the notification mode instructed by the notification mode DB 13b, the control unit 12 can cause the notification device 2 to execute a notification by an appropriate mode corresponding to the "state of being arranged in the pocket".

Note that, in order to prevent confusion between the state of being in the pocket of the clothing of the user and the state of being in the bag, it is also possible to perform determination using not only the detection signals of the proximity sensor and the illuminance sensor described above but also the detection signal of the temperature sensor.

Fourth Example

In a fourth example, in a case where the notification device 2 is arranged in contact with the user, in a case where the notification device 2 is in a state of being held by the hand of the user, the notification is performed by vibration weaker than in a case where the notification device 2 is arranged in contact with other portions of the user.

Whether or not the notification device 2 is being held by the user can be determined by the control unit 22 in the notification device 2 on the basis of, for example, the detection signals of the proximity sensor and the temperature sensor in the sensor unit 25. Furthermore, whether or not the notification device 2 is arranged in contact with a portion other than the hand can be determined on the basis of a determination result as to whether or not the notification device 2 is arranged in contact with the user and a determination result as to whether or not the notification device 2 is being held by the user. That is, in a case where it is determined that the notification device 2 is arranged in contact with the user and a determination result indicating that the notification device 2 is not held is obtained, it can be determined that the notification device 2 is arranged in contact with a portion other than the hand.

In this case, in the notification mode DB 13b, at least information indicating a "state of being held by the hand of the user" and information indicating a "state of being arranged in contact with another portion" are stored as the arrangement state type information described above, information indicating a notification mode as a "notification by weak vibration" is stored in association with the former arrangement state type information, and information indicating a notification mode as a "notification by strong vibration" is stored in association with the latter arrangement state type information.

In this case, in a case where it is determined that the specific sound has been detected as the environmental sound, the control unit 12 inquires of the notification device 2 about the arrangement state of the notification device 2. As a result of the inquiry, in a case where the notification device 2 is in a state of being held by the hand of the user, an instruction is given to the notification device 2 to execute a "notification by weak vibration" according to the information content of the notification mode DB 13b. On the other hand, in a case where the notification device 2 is in a state of being arranged in contact with another portion, an instruction is given to the notification device 2 to execute a "notification by strong vibration" according to the information content of the notification mode DB 13b.

Note that the method of determining whether or not the notification device is being held by the user is not limited to the method described above, and another method such as determination based on an image captured by an image sensor is also conceivable, for example.

Furthermore, the state in which the notification device 2 is being held by the user can be further classified to a state of whether or not the user is operating the notification device 2. In a case where such a state is classified, in a state where the user is operating the notification device 2, it is also conceivable to control the notification mode such that the intensity of vibration is lowered as compared with a case where the user is not operating the notification device 2.

Furthermore, as the notification mode control in a case where the notification device 2 is arranged in contact with the user, in a case where the contact portion can be determined, a notification by vibration at a frequency with high sensitivity to the portion can be performed.

Fifth Example

In a fifth example, in a case where the notification device 2 is in a state of being arranged in contact with the walking user, the notification by stronger vibration than in a state where the notification device 2 is not arranged in contact with the walking user is executed.

As the strong vibration in this case, vibration at a frequency near the resonance point of the vibration device included in the sensor unit 25 is considered.

Whether or not the user is walking can be determined by analyzing the detection signals of, for example, the G sensor and the gyro sensor in the sensor unit 25 in the notification device 2. Furthermore, whether or not the notification device 2 is arranged in contact with the user can be determined by the above-described method in the notification device 2. On the basis of these determination results, it is possible to determine whether or not the notification device 2 is arranged in proximity to the walking user.

In this case, in the notification mode DB 13*b*, at least information indicating a "state of being arranged in contact with the walking user" and information indicating a "state other than the state of being arranged in contact with the walking user" are stored as the arrangement state type information, information indicating a notification mode as the "notification by strong vibration" is stored in association with the former arrangement state type information, and information indicating a notification mode as the "notification by weak vibration" is stored in association with the latter arrangement state type information.

In this case, in a case where it is determined that the specific sound has been detected as the environmental sound, the control unit 12 inquires of the notification device 2 about the arrangement state of the notification device 2. As a result of the inquiry, in a case where the notification device 2 is in a state other than the state of being arranged in contact with the walking user, an instruction is given to the notification device 2 to execute a "notification by weak vibration" according to the information content of the notification mode DB 13*b*. On the other hand, in a case where the notification device 2 is in a state of being arranged in contact with the walking user, an instruction is given to the notification device 2 to execute a "notification by strong vibration" according to the information content of the notification mode DB 13*b*.

Sixth Example

In a sixth example, in a case where the notification device 2 is in a state of being arranged in contact with the walking user, control is performed such that the notification by tactile stimulation (here, vibration) is performed in a low vibration period during walking.

Here, the low vibration period means a period excluding a period in which relatively large vibration is generated in the vicinity of the foot landing timing during walking. The low vibration period can be estimated by analyzing the detection signals of, for example, the G sensor and the gyro sensor in the sensor unit 25 in the notification device 2.

In this case, in the notification mode DB 13*b*, at least information indicating a "state of being arranged in contact with the walking user" is stored as the arrangement state type information, and information indicating the notification mode as the "notification by vibration in the low vibration period" is stored in association with the arrangement state type information.

In this case, in a case where it is determined that the specific sound has been detected as the environmental sound, the control unit 12 inquires of the notification device 2 about the arrangement state of the notification device 2. As a result of the inquiry, in a case where the notification device 2 is in a state of being arranged in contact with the walking user, an instruction is given to the notification device 2 to execute a "notification by vibration in the low vibration period" according to the information content of the notification mode DB 13*b*.

In response to this instruction, in the notification device 2, the control unit 22 causes the notification unit 21 to execute, for example, estimation of the low vibration period based on the detection signals of, for example, the G sensor and the gyro sensor, and notification by vibration in the low vibration period.

Seventh Example

In a seventh example, the notification mode is controlled on the basis of a separation distance of the notification device 2 from the user. Specifically, here, an example will be described in which, in a case where the notification device 2 is located at a position away from the user (for example, the separation distance from the user exceeds a threshold value), the notification is performed with a larger volume than in a case where the notification device 2 is located near the user (for example, the distance from the user is equal to or less than the threshold value described above).

The separation distance of the notification device 2 from the user can be estimated in the notification device 2 on the basis of, for example, a captured image by the image sensor in the sensor unit 25 (for example, estimated from the size of a subject as the user appearing in the captured image).

In this case, in the notification mode DB 13*b*, at least information indicating a "state where the notification device 2 is located at a position away from the user" and information indicating a "state where the notification device 2 is located near the user" are stored as the arrangement state type information, information indicating a notification mode as a "notification with a large volume" is stored in association with the former arrangement state type information, and information indicating a notification mode as a "notification with a low volume" is stored in association with the latter arrangement state type information.

In this case, in a case where it is determined that the specific sound has been detected as the environmental sound, the control unit 12 inquires of the notification device 2 about the arrangement state of the notification device 2, and as a result of the inquiry, in a case where the notification device 2 is in a state of being located at a position away from the user, an instruction is given to the notification device 2 to execute a "notification with a large volume" according to the information content of the notification mode DB 13*b*. On the other hand, in a case where the notification device 2 is in a state of being located near the user, an instruction is given to the notification device 2 to execute a "notification with a low volume" according to the information content of the notification mode DB 13*b*.

Note that the method of estimating the separation distance of the notification device 2 from the user is not limited to the above, and for example, other methods such as a method using a distance image by a ToF sensor and a method using a sonar or the like can be adopted.

Furthermore, in the above description, the method of controlling the notification volume according to the separation distance from the user has been exemplified. However, for example, it is also possible to switch a device that performs a notification according to the separation distance from the user, such as performing a notification by tactile stimulation in a case where the notification device 2 is located near the user and performing a notification by sound in a case where the notification device 2 is located away from the user.

Eighth Example

In an eighth example, in a case where the notification device 2 is arranged in a noise environment, control is performed such that a notification is performed not by sound but by tactile stimulation. Specifically, a notification by sound is performed in a case where the notification device 2 is arranged in a non-noise environment that is not a noise environment, and a notification by vibration is performed in a case where the notification device 2 is disposed in a noise environment.

The determination as to whether or not the notification device 2 is in a noise environment can be determined in the notification device 2 on the basis of the sound collection signal of the microphone in the sensor unit 25.

In this case, in the notification mode DB 13b, at least information indicating a "state where the notification device 2 is arranged in a noise environment" and information indicating a "state where the notification device 2 is arranged in a non-noise environment" are stored as the arrangement state type information, information indicating a notification mode as a "notification by vibration" is stored in association with the former arrangement state type information, and information indicating a notification mode as a "notification by sound" is stored in association with the latter arrangement state type information.

In this case, in a case where it is determined that the specific sound has been detected as the environmental sound, the control unit 12 inquires of the notification device 2 about the arrangement state of the notification device 2, and as a result of the inquiry, in a case where the notification device 2 is in a state of being arranged in a non-noise environment, an instruction is given to the notification device 2 to execute a "notification by sound" according to the information content of the notification mode DB 13b. On the other hand, in a case where the notification device 2 is in a state of being arranged in a noise environment, an instruction is given to the notification device 2 to execute a "notification by vibration" according to the information content of the notification mode DB 13b.

Note that, in the above description, an example has been described in which the notification device is switched depending on whether or not the notification device is arranged in a noise environment. However, for example, in a case where it is assumed that a notification by sound is performed, it is also possible to adopt a method of switching the notification mode for the notification by the same notification device, such as performing a notification with a larger volume in a case where the notification device is arranged in a noise environment than in a case where the notification device is arranged in a non-noise environment.

Ninth Example

In a ninth example, control is performed such that a notification in a different mode is performed between a case where the notification device 2 is arranged at a position on a specific ear side of either the left or right ear of the user and a case where the notification device 2 is not arranged at a position on the specific ear side. This is a suitable control method, for example, in a case where the user is a person with hearing loss in one ear.

Here, it is assumed that the "specific ear" is the right ear in a case where the user has the right ear with hearing loss, and the "specific ear" is the left ear in a case where the user has the left ear with hearing loss. As a specific example of the control, in a case where it is assumed that a notification by sound is performed, a notification is performed with a larger volume in a case where the notification device 2 is arranged at a position on the specific ear side of either the left or right ear of the user than in a case where the notification device 2 is not arranged at a position on the specific ear side of either the left or right ear of the user.

Whether or not the notification device 2 is arranged at a position on a specific ear side of either the left or right ear of the user can be determined, for example, on the basis of image analysis of the captured image by the image sensor in the sensor unit 25. For example, in a case where the right side of the user appears in the captured image, it can be determined that the notification device 2 is arranged at a position on the right ear side of the user, and conversely, in a case where the left side of the user appears in the captured image, it can be determined that the notification device 2 is arranged at a position on the left ear side of the user.

In this case, in the notification mode DB 13b, at least information indicating a "state where the notification device 2 is located at a position on a specific ear side of either the left or right ear of the user" and information indicating a "state where the notification device 2 is located at a position on a side opposite to the specific ear side" are stored as the arrangement state type information, information indicating a notification mode as a "notification with a large volume" is stored in association with the former arrangement state type information, and information indicating a notification mode as a "notification with a low volume" is stored in association with the latter arrangement state type information.

In this case, in a case where it is determined that the specific sound has been detected as the environmental sound, the control unit 12 inquires of the notification device 2 about the arrangement state of the notification device 2, and as a result of the inquiry, in a case where the notification device 2 is in a state of being located at a position on a specific ear side of either the left or right ear of the user, an instruction is given to the notification device 2 to execute a "notification with a large volume" according to the information content of the notification mode DB 13b. On the other hand, in a case where the notification device 2 is in a state of being arranged at a position on a side opposite to the specific ear side, an instruction is given to the notification device 2 to execute a "notification with a low volume" according to the information content of the notification mode DB 13b.

Note that, whether or not the notification device 2 is arranged at a position on a side of the ear with hearing loss can also be determined on the basis of a communication result with a hearing aid in a case where the user wears the hearing aid capable of communicating with the notification device 2, for example.

Furthermore, the control method as the ninth example can be widely applied to a situation where the user has difficulty hearing in only one ear, such as not only a case where the user is a person with hearing loss in one ear and but also a case where the user is wearing an earphone in only one ear.

Furthermore, in the above description, an example has been described in which the notification volume is controlled according to whether or not the notification device 2 is arranged at a position on a specific ear side of either the left or right ear of the user on the premise of a case where the notification by sound is performed. However, for example, control can be performed to switch a device that performs a notification according to whether or not the notification device 2 is arranged at a position on the specific ear side, such as performing a notification by sound in a case where the notification device 2 is arranged at a position on a side opposite to the specific ear side and performing a notification by vibration in a case where the notification device 2 is arranged at a position on the specific ear side.

Note that, in the ninth example, in a case where a notification by sound is performed, the volume of the sound may be controlled according to the difficulty of hearing of the user (for example, the separation distance of the notification device 2 from the user).

[1-3. Processing Procedure]

An example of a specific processing procedure for realizing the notification control as the first embodiment described above will be described with reference to the flowchart of FIG. 2.

Figure 2:
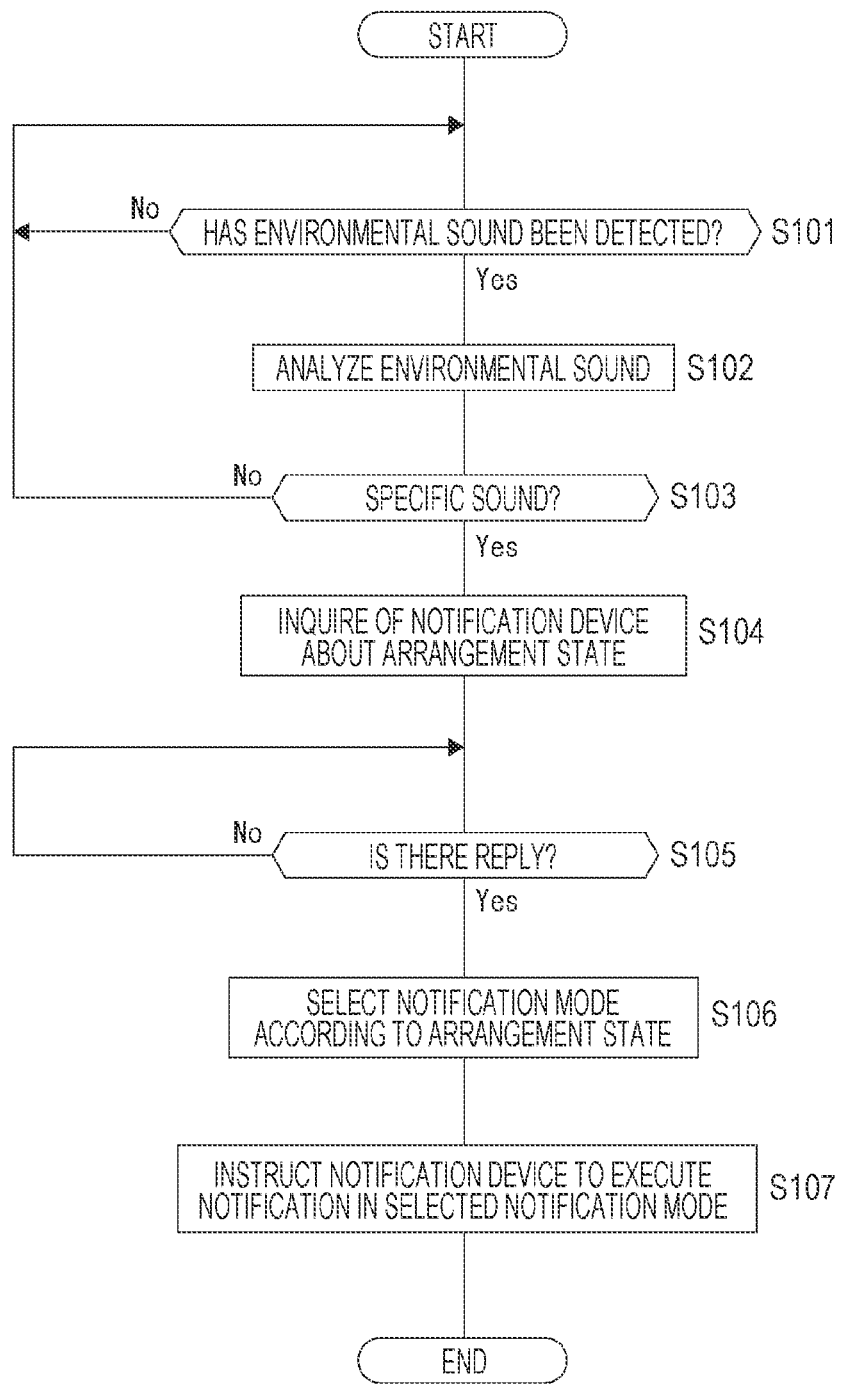
FIG. 2 is a flowchart illustrating an example of a specific processing procedure for realizing notification control as the first embodiment.

Note that, for example, the processing illustrated in FIG. 2 is executed by the control unit 12 (CPU) on the basis of the program stored in a predetermined storage device such as a built-in ROM.

First, the control unit 12 waits for detection of the environmental sound in step S101. That is, the processing waits until the sound collection unit 11 detects a sound having a predetermined volume or more.

In a case where the sound collection unit 11 detects the environmental sound, the control unit 12 analyzes the environmental sound in step S102, and determines whether or not the environmental sound is the specific sound in subsequent step S103. As understood from the above description, the analysis processing in step S102 is performed by the control unit 12 on the basis of the data for voice analysis stored in the specific sound DB 13a.

In a case where the detected environmental sound is not the specific sound in step S103, the control unit 12 returns to step S101.

On the other hand, in a case where the detected environmental sound is the specific sound in step S103, the control unit 12 proceeds to step S104, and inquires of the notification device 2 about the arrangement state.

In response to this inquiry, the control unit 22 of the notification device 2 performs the processing of determining the arrangement state described in the first to ninth examples. Specifically, for example, in the case of the first example, it is determined whether or not the notification device is in the state of being arranged on the immovable object, and in the case of the fifth example, it is determined whether or not the notification device is in the state of being arranged in contact with the walking user. Thus, the arrangement state corresponding to each example among the first example to the ninth example is determined.

In step S105 following step S104, the control unit 12 waits for a reply to the inquiry made in step S104, and in a case where there is a reply, the control unit 12 proceeds to step S106, and selects a notification mode according to the arrangement state. That is, the notification mode corresponding to the replied determination result of the arrangement state is selected on the basis of the storage information in the notification mode DB 13b.

In step S107 following step S106, the control unit 12 instructs the notification device 2 to execute a notification by the selected notification mode, and ends the series of processing illustrated in FIG. 2.

[1-4. Regarding Notification Indicating Type of Environmental Sound]

Here, regarding the notification relating to the detected environmental sound, a notification indicating the type of the detected sound can also be performed. For example, regarding the notification by tactile stimulation, a notification indicating only that the environmental sound has been detected and a notification indicating the type of the detected sound can be performed for the detection of one environmental sound. For example, regarding the notification by vibration, the notification indicating only that the environmental sound has been detected is a notification by relatively strong vibration in the vicinity of the resonance frequency of the vibration device in the notification unit 21. On the other hand, as the notification indicating the type of the detected sound, it is conceivable to perform a notification by vibration (vibration with relatively high resolution) in a relatively complicated pattern, which allows intuitive understanding of the type of sound, for example, performing a notification with a vibration pattern similar to that of baby's crying in a case where the detected environmental sound is baby's crying.

Regarding the notification by tactile stimulation such as vibration, for the notification indicating the type of the detected sound, there is a tendency to select a tactile stimulation pattern having a relatively high resolution in order to improve discriminability of the sound type by the user. Therefore, it is difficult to select a tactile stimulation pattern having a low resolution, which is easily noticed by the user, such as vibration in the vicinity of a resonance frequency as described above, for example. Therefore, as described above, by separately performing the notification indicating only that the environmental sound has been detected and the notification indicating the type of the detected sound, it is possible to perform a notification of a pattern which is specialized only for the notification of detection and is easily noticed, and then perform a notification by a pattern having a high resolution for discriminating the sound type.

Therefore, the possibility that the user notices the notification can be increased, and the reliability of the notification system can be improved.

Note that the following example is conceivable as an example of performing the notification indicating only that the environmental sound has been detected and the notification indicating the type of the detected sound.

That is, in a case where the notification device 2 is arranged in the pocket of the walking user, the notification indicating the type of the detected sound is not performed, and the notification indicating only that the environmental sound has been detected is performed. Thereafter, in a case where it is determined that the user is holding the notification device 2, the notification indicating the type of the detected sound is performed.

Therefore, it is possible to allow the user to recognize the type of the detected sound while securing the ease of noticing the notification.

Note that, regarding the notification by vibration, the notification mode by vibration can be changed depending on a case where the state of the notification device 2 corresponds to a specific state and a case where the state of the notification device 2 does not correspond to a specific state. For example, it is conceivable to change the frequency of vibration, change the vibration intensity, change the vibration pattern, and the like.

2. Second Embodiment

Next, a second embodiment will be described. In the second embodiment, the notification device 2 to execute a notification is selected according to the type of the environmental sound.

Figure 3:
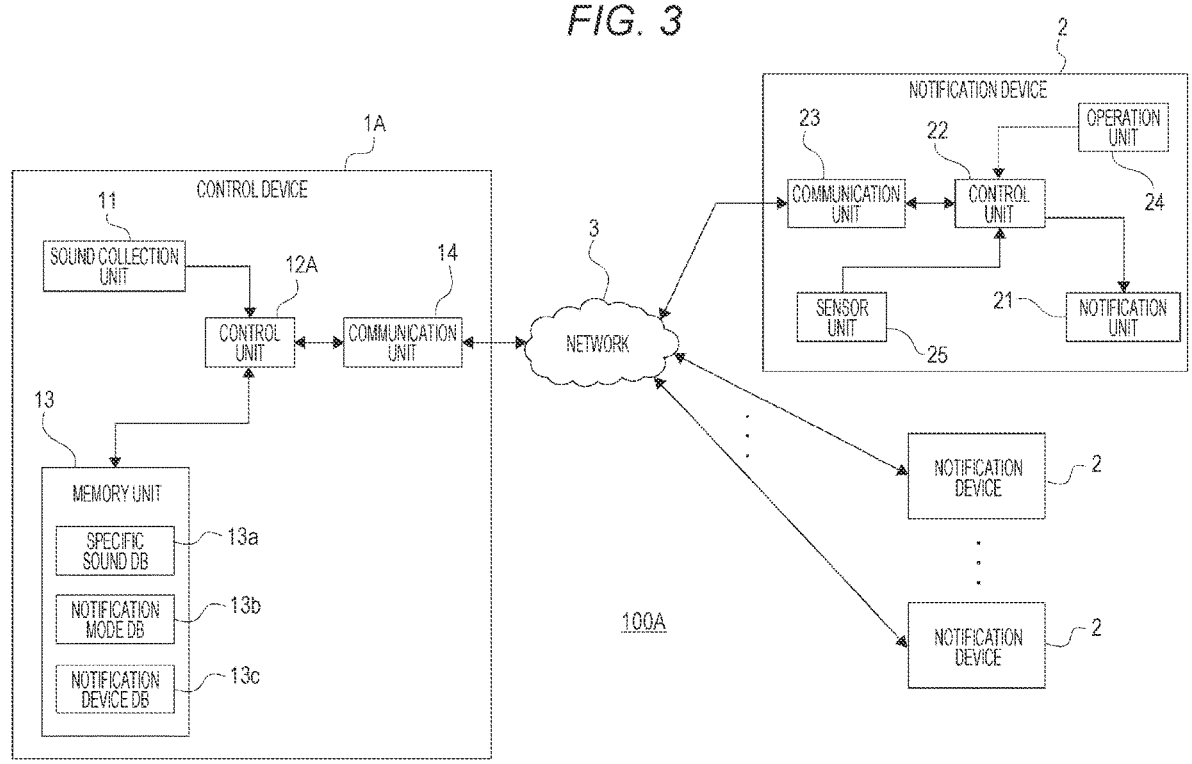
FIG. 3 is a block diagram illustrating a configuration example of a notification system as a second embodiment.

FIG. 3 is a block diagram illustrating a configuration example of a notification system 100A as the second embodiment.

Note that, in the following description, the same reference numerals are given to portions similar to those already described, and description thereof is omitted.

A difference from the notification system 100 of the first embodiment is that a control device 1A is provided instead of the control device 1, and a plurality of notification devices 2 is provided.

The control device 1A is different from the control device 1 in that a control unit 12A is provided instead of the control unit 12 and information as a notification device DB 13c is stored in the memory unit 13.

The control unit 12A selects the notification device 2 to execute a notification, according to the type of the detected environmental sound. Specifically, the control unit 12A in the present example selects the notification device 2 to execute a notification as follows.

That is, in a case where "rain sound" is detected as the environmental sound, the notification device 2 of a predetermined specific user (for example, mother) is selected as the notification device 2 to execute a notification. This is intended for taking in laundry.

Furthermore, in a case where the "notification sound of the home appliance" (for example, notification sound of a rice cooker, a washing machine, a bath heater, or the like) is detected as the environmental sound, the notification device 2 closest to an estimated sound source position of the environmental sound is selected as the notification device 2 to execute a notification, among the plurality of notification devices 2.

Furthermore, in a case where "disaster prevention broadcasting of the local government" (broadcasting using outdoor speakers) is detected as the environmental sound, all the notification devices 2 are selected as the notification devices 2 to execute a notification.

The control unit 12A selects the notification device 2 according to the type of such an environmental sound on the basis of the storage information of the notification device DB 13c in the memory unit 13.

The notification device DB 13c stores information indicating the type of target environmental sound (hereinafter, described as "environmental sound type information") and information indicating the selection method of the notification device 2 corresponding to the environmental sound type (hereinafter, described as "device selection method information") in association with each other. In the present example, in order to realize the selection method of each example described above as the selection method of the notification device 2, each piece of information of "rain sound", "notification sound of the home appliance", and "disaster prevention broadcasting of the local government" is stored as the environmental sound type information, and each piece of information indicating "selecting the notification device 2 of the specific user", "selecting the notification device 2 closest to the estimated sound source position of the environmental sound", and "selecting all the notification devices 2" is associated with each piece of information of "rain sound", "notification sound of the home appliance", and "disaster prevention broadcasting of the local government" as the device selection method information.

By using such a notification device DB 13c, it is possible to cause the notification device 2 considered to be appropriate according to the type of the detected environmental sound to execute the notification.

Note that, in the present example, in the notification device DB 13c, the association between the environmental sound type information and the device selection method information is performed by user's presetting. This presetting is performed by the control unit 12A of the control device 1A in accordance with a user operation input via the operation unit 24 in the notification device 2.

Here, in the example of the "notification sound of the home appliance" described above, the information of the estimated sound source position of the detected environmental sound is used, but the estimated sound source position can be obtained by the control unit 12A performing the sound analysis processing based on each sound collection signal by the above-described microphone array of the sound collection unit 11.

Furthermore, in the example of the "notification sound of the home appliance", the position information of each notification device 2 is used, but as the position information of each notification device 2, detection information by the position sensor provided as the sensor unit 25 in the notification device 2 is used.

Furthermore, in the present example, in the selection of the notification device 2 to execute a notification, in a case where a separation distance D1 from the sound source is larger than a predetermined distance d1, the notification is not performed. By not performing the notification in a case where the distance D1 from the estimated sound source position is large as described above, a notification can be performed to a user located at a short distance to such an extent that an event indicated by the environmental sound, such as an event of rice cooking completion indicated by the notification sound of the rice cooker, can be coped with, for example.

An example of a specific processing procedure for realizing the notification control as the second embodiment described above will be described with reference to the flowchart of FIG. 4.

Figure 4:
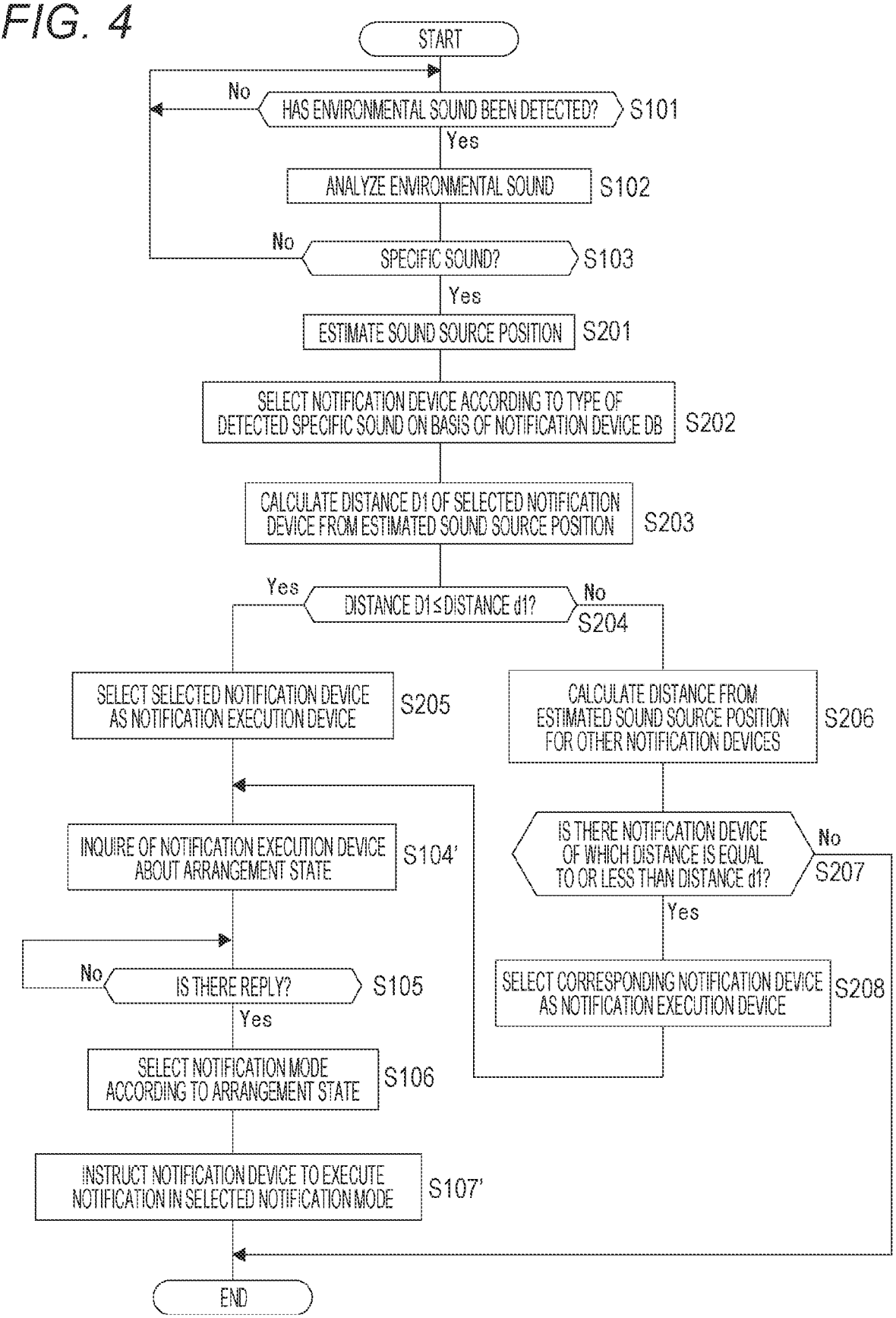
FIG. 4 is a flowchart illustrating an example of a specific processing procedure for realizing notification control as the second embodiment.

For example, the processing illustrated in FIG. 4 is executed by the control unit 12A (CPU) on the basis of the program stored in a predetermined storage device such as a built-in ROM.

Here, in FIG. 4, a processing procedure corresponding to the above-described example of "rain sound" and "notification sound of the home appliance" is illustrated, and a processing procedure corresponding to the example of "disaster prevention broadcasting of the local government" (example of selecting all the notification devices 2) will be separately described.

In FIG. 4, first, the processing from step S101 to step S103 is similar to the case of FIG. 2, and thus redundant description is avoided.

In this case, in a case where it is determined in step S103 that the specific sound has been detected, the control unit 12A estimates the sound source position in step S201. That is, the above-described estimated sound source position is obtained for the detected specific sound.

In step S202 following step S201, the control unit 12A selects the notification device 2 according to the type of the detected specific sound on the basis of the notification device DB 13c. That is, the notification device 2 is selected based on the device selection method information described above.

In step S203 following step S202, the control unit 12A calculates the distance D1 of the selected notification device 2 from the estimated sound source position. That is, in the example of "rain sound", the distance D1 is calculated for the notification device 2 of the specific user, and in the example of "notification sound of the home appliance", the distance D1 is calculated for the notification device 2 closest to the estimated sound source position.

In step S204 following step S203, the control unit 12A determines whether or not the distance D1 is equal to or less than the distance d1.

In a case where the distance D1 is equal to or less than the distance d1, the control unit 12A proceeds to step S205, selects the selected notification device 2 as a notification execution device (notification device 2 to execute a notification), and proceeds to processing of step S104'.

The processing of step S104' is different from the processing of step S104 described above only in that the inquiry destination of the arrangement state is replaced with a "notification execution device".

In response to the inquiry of step S104', the control unit 12A executes the processing of steps S105 and S106, and selects the notification mode according to the arrangement state replied in response to the inquiry of step S104' on the basis of the notification mode DB 13b. Then, in step S107', the control unit 12A instructs the notification execution device to execute a notification by the selected notification mode, and ends the series of processing illustrated in FIG. 4.

Furthermore, in step S204 described above, in a case where it is determined that the distance D1 is not equal to or less than the distance d1, the control unit 12A proceeds to step S206, calculates the distance from the estimated sound source position for the other notification devices 2, and determines whether or not there is a notification device 2 of which the distance from the estimated sound source position is equal to or less than the distance d1 in subsequent step S207.

In step S207, in a case where there is a notification device 2 of which the distance from the estimated sound source position is equal to or less than the distance d1, the control unit 12A selects the corresponding notification device 2 as the notification execution device in step S208, and proceeds to the processing of step S104'. Therefore, in a case where the selected notification device 2 has the distance d1 or less, the notification is performed by another notification device 2 having the distance d1 or less.

On the other hand, in a case where there is no notification device 2 of which the distance from the estimated sound source position is equal to or less than the distance d1 in step S207, the control unit 12A ends the series of processing illustrated in FIG. 4. Therefore, in a case where there is no notification device 2 having the distance d1 or less, the notification is not performed by any of the notification devices 2.

Here, in the example of "disaster prevention broadcasting of the local government" in which all the notification devices 2 are selected, the control unit 12A determines whether or not the distance D1 is equal to or less than the distance d1 for all the notification devices 2 in step S204. In a case where there is a notification device 2 of which the distance D1 is equal to or less than the distance d1, the control unit 12A selects the notification device 2 as the notification execution device, and proceeds to the processing of step S104'. On the other hand, in a case where there is no notification device 2 of which the distance D1 is equal to or less than the distance d1, the control unit 12A ends the processing.

Here, in the above description, regarding the notification control using the distance d1, after the notification device 2 is selected according to the type of the environmental sound, it is determined whether or not the distance D1 of the notification device 2 is equal to or less than the distance d1. However, it is also possible to adopt a method in which whether or not the distance D1 is equal to or less than the distance d1 is determined for all the notification devices 2 before the notification device 2 is selected according to the type of the environmental sound, and the notification device 2 is selected according to the type of the environmental sound only in a case where there is the notification device 2 of which the distance D1 is equal to or less than the distance d1.

Furthermore, in the above description, in a case where the notification device 2 selected according to the type of the environmental sound is not present near the sound source of the environmental sound, another notification device 2 close to the sound source is selected as the notification execution device. However, in a case where the notification device 2 selected according to the type of the environmental sound is not present near the sound source of the environmental sound, a second desired notification device decided by the user may be selected as the notification execution device.

Furthermore, in the notification device DB 13c, the association between the type of the environmental sound and the notification device 2 to execute a notification can also be performed on the basis of a learning result from past user's behavior instead of being preset by the user. For example, the user who has reacted to the notification is detected from the captured image of the camera or the like, and which user's notification device 2 is to perform a notification is learned from the correspondence relationship between the notification and the reactive user.

Furthermore, regardless of the type of the environmental sound, the notification device 2 close to the estimated sound source position can be selected as the notification execution device.

3. Third Embodiment

In a third embodiment, the notification mode is controlled according to the urgency of the detected environmental sound.

Here, the urgency of the environmental sound is an index representing how quickly the user should cope with the event indicated by the environmental sound in a case where the environmental sound is generated. For example, even in the case of the environmental sound relating to the event to be notified to the user, the notification sound or the like of the rice cooker has lower urgency than that of the notification sound of, for example, disaster prevention broadcasting of the local government or earthquake early warning by television.

In the third embodiment, such urgency is determined for each target environmental sound, and the notification mode is controlled according to the urgency of the environmental sound.

Figure 5:
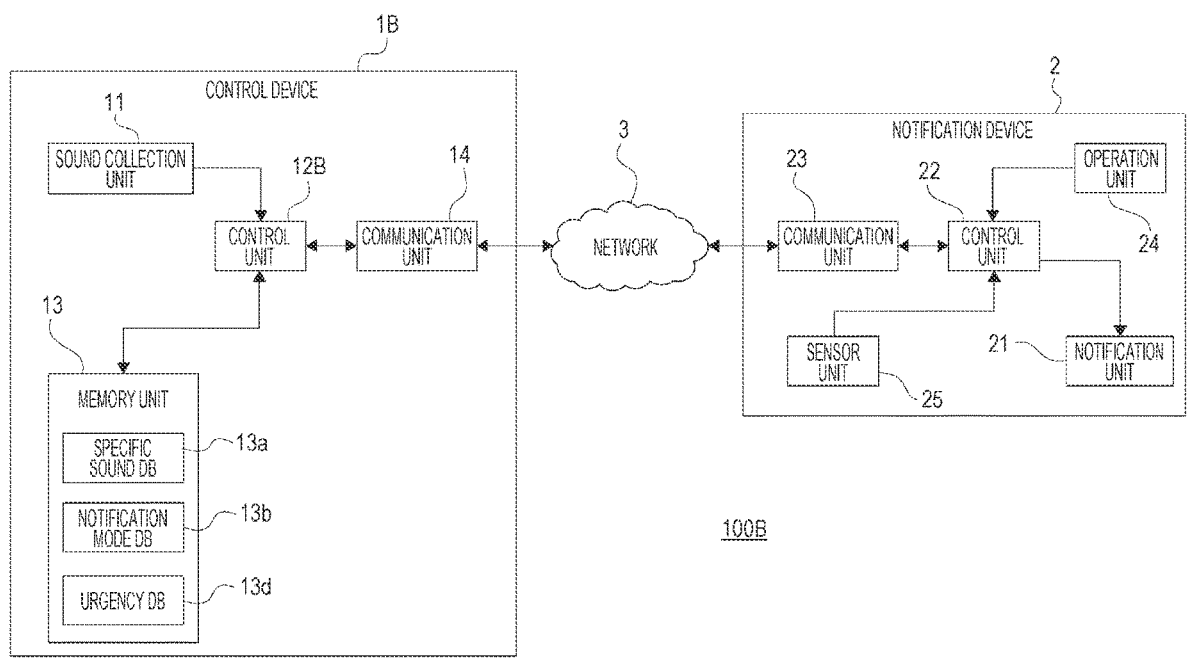
FIG. 5 is a block diagram illustrating a configuration example of a notification system as a third embodiment.

FIG. 5 is a block diagram illustrating a configuration example of a notification system 100B as the third embodiment.

The notification system 100B is different from the notification system 100 illustrated in FIG. 1 in that a control device 1B is provided instead of the control device 1. The control device 1B is different from the control device 1 in that a control unit 12B is provided instead of the control unit 12 and information as an urgency DB 13d is stored in the memory unit 13.

The control unit 12B controls the notification mode by the notification device 2 according to the urgency of the detected environmental sound on the basis of the storage information in the urgency DB 13d in the memory unit 13.

The urgency DB 13d stores the above-described environmental sound type information (information indicating the type of target environmental sound) and information indicating the urgency corresponding to the environmental sound type in association with each other. In the present example, it is assumed that the urgency of each environmental sound type is determined in advance by the user's operation.

Here, in the present example, a delay time from the detection to the notification of the environmental sound is controlled as the control of the notification mode according to the urgency. Specifically, the control unit 12B sets a delay time Td to be shorter in a case where the urgency of the detected environmental sound is high than in a case where the urgency is low. Note that the delay time Td here can include "0".

Therefore, it is possible to prevent the notification for the environmental sound with low urgency from being given priority in terms of timing over the notification for the environmental sound with high urgency.

An example of a specific processing procedure for realizing the notification control as the third embodiment will be described with reference to the flowchart of FIG. 6.

Figure 6:
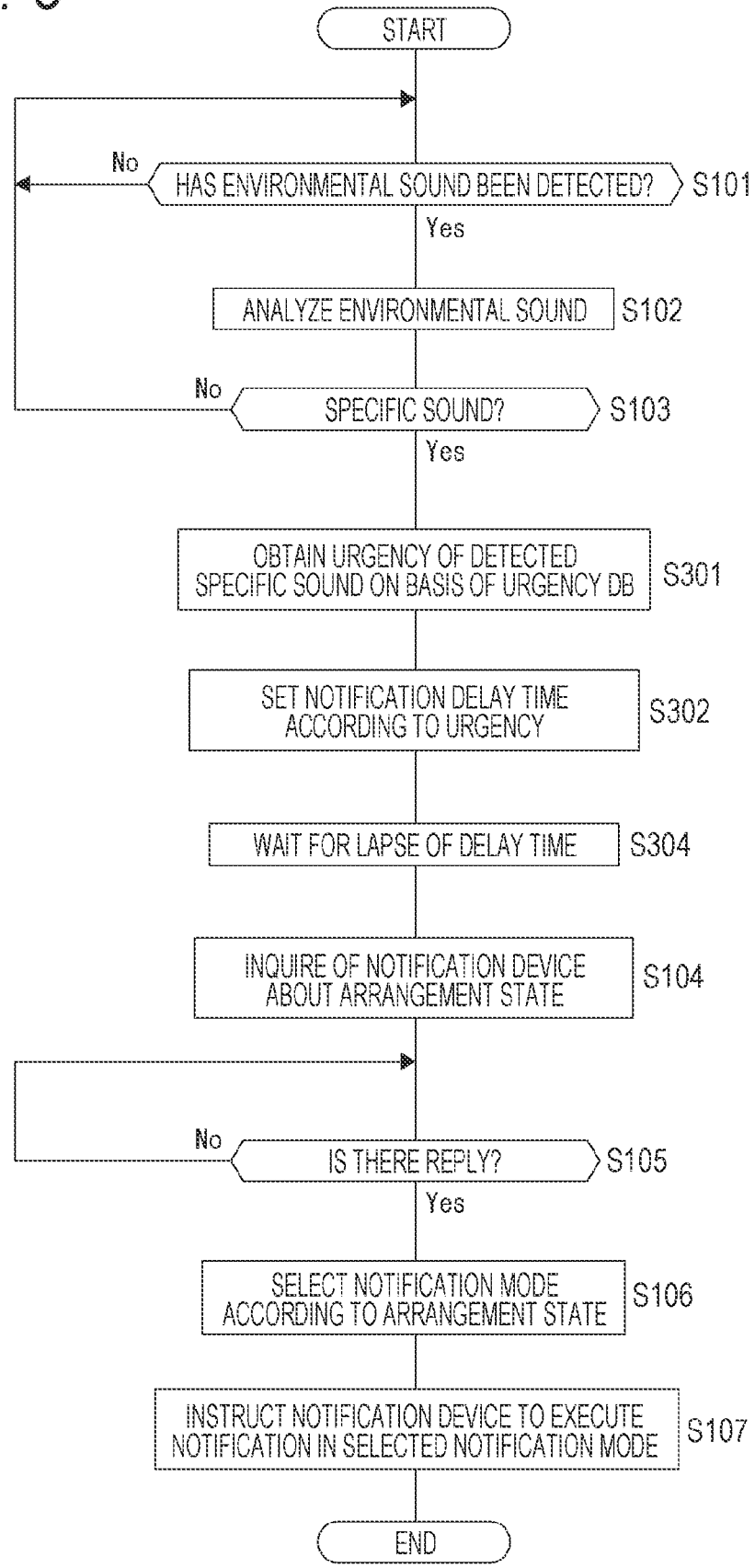
FIG. 6 is a flowchart illustrating an example of a specific processing procedure for realizing notification control as the third embodiment.

For example, the processing illustrated in FIG. 6 is executed by the control unit 12B (CPU) on the basis of the program stored in a predetermined storage device such as a built-in ROM.

Also in this case, the processing of steps S101 to S103 is executed similarly to the case of the previous embodiments.

In a case where it is determined in step S103 that the specific sound has been detected, the control unit 12B proceeds to step S301 to obtain the urgency of the detected specific sound on the basis of the urgency DB 13*d*. That is, information on the corresponding urgency is acquired from the urgency DB 13*d* on the basis of the environmental sound type information on the detected specific sound.

In step S302 following step S301, the control unit 12B sets a notification delay time (delay time Td) according to the urgency. As described above, in the present example, the delay time Td is set shorter in a case where the urgency is high than in a case where the urgency is low.

In step S303 following step 302, the control unit 12B waits for the lapse of the delay time Td. Then, after waiting for the lapse of the delay time Td, the processing of steps S104 to S107 described above (processing for causing the notification device 2 to execute a notification by a mode according to the arrangement state of the notification device 2) is executed, and the series of processing illustrated in FIG. 6 is ended.

Note that, in the above description, the urgency DB 13*d* is constructed on the basis of the user's operation. However, for example, a DB constructed in advance on the manufacturer side of the control device 1B can be used as the urgency DB 13*d*.

Furthermore, for example, in a case where the detected environmental sound is a sound relating to disaster prevention broadcasting, the urgency may be determined on the basis of an analysis result of announcement content or real-time news information.

Alternatively, the urgency may be determined on the basis of a result of learning the user's behavior. For example, it is conceivable that a time length from when a certain environmental sound is detected to when the user copes with an event indicated by the environmental sound, such as a time length from when a horn sound in a case where hot water of a kettle boils is detected as the environmental sound to when the user turns off the fire, is measured over a predetermined learning period, and the urgency for each environmental sound is determined from the measurement result (it is estimated that the shorter the time length to cope is, the higher the urgency is).

Furthermore, the control of the notification mode according to the urgency can be control based on the information as to whether or not the user is wearing a welfare device such as a hearing aid. For example, in a case where the user who usually wears the hearing aid does not wear the hearing aid, it is difficult for the user to hear the environmental sound, and thus the urgency may be increased as a whole.

Furthermore, the control of the notification mode according to the urgency may be control based on the information indicating the type of the user (for example, an adult, a child, a person with hearing loss, or the like). For example, in a situation where there is only a person who is hard to hear such as a person with hearing loss or a child as the user, it is conceivable to increase the urgency as a whole.

4. Fourth Embodiment

In a fourth embodiment, the notification mode is controlled on the basis of the state of the user of the notification device 2. Here, an example will be described in which the notification mode is controlled on the basis of the information as to whether or not the user has a hearing impairment. As the hearing impairment, for example, a person with hearing loss may not notice his/her name even when the name is called in a hospital or the like. Furthermore, since a person with hyperacusis blocks sound, the person may not notice his/her name even when the name is similarly called.

Therefore, in a case where the pronunciation of a specific name is detected as the environmental sound, in a case where the user has a hearing impairment, the notification sound is made larger than that in a case where the user does not have a hearing impairment, or the notification by tactile stimulation such as vibration is performed. Hereinafter, an example will be described in which such a function is realized by, for example, a portable notification device alone such as a smartphone.

Figure 7:
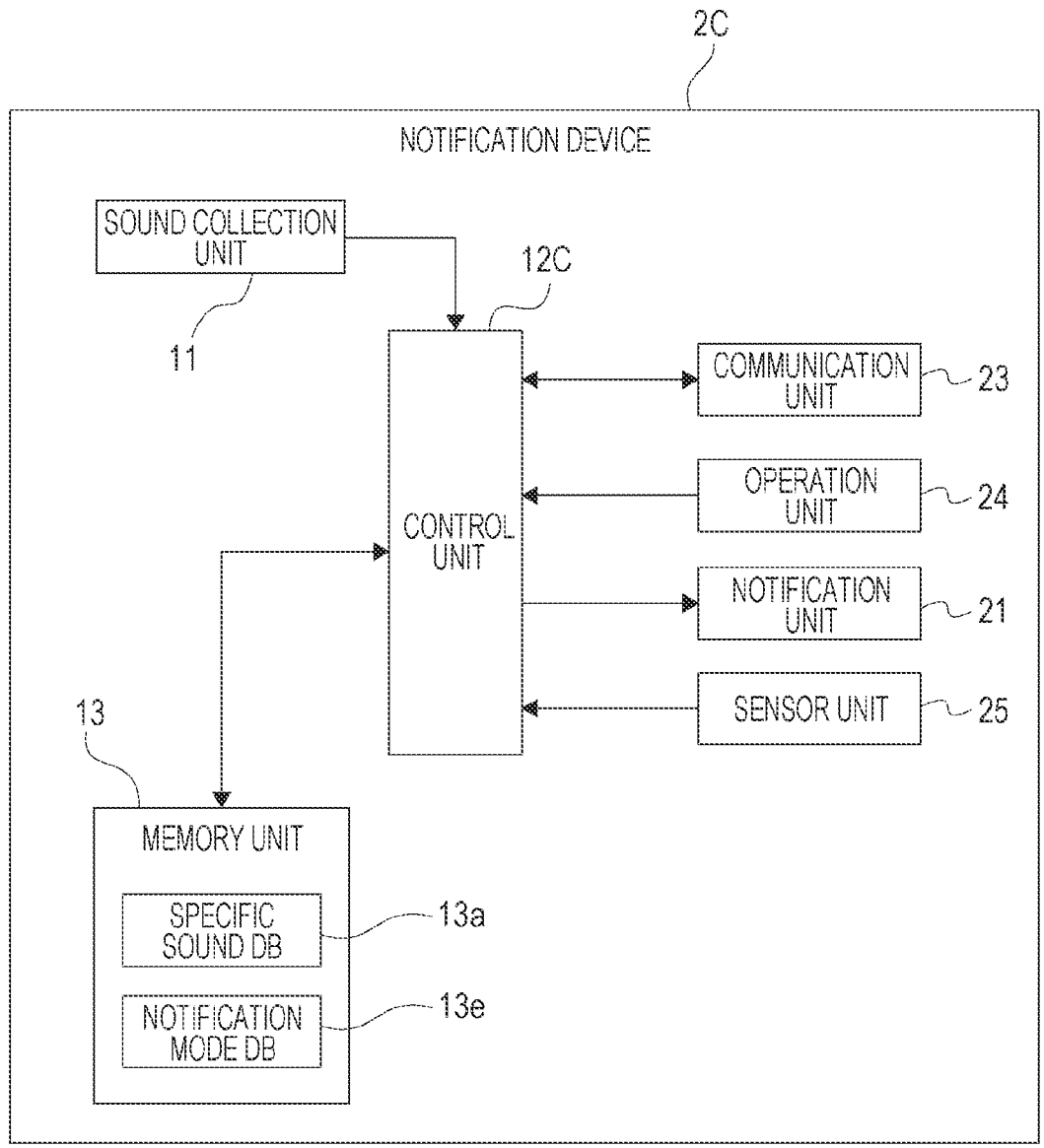
FIG. 7 is a block diagram illustrating an internal configuration example of a notification device as a fourth embodiment.

FIG. 7 is a block diagram illustrating an internal configuration example of a notification device 2C as the fourth embodiment.

As illustrated, the notification device 2C includes the sound collection unit 11, a control unit 12C, the memory unit 13, the notification unit 21, the communication unit 23, the operation unit 24, and the sensor unit 25.

As illustrated, the memory unit 13 stores the specific sound DB 13*a*, and information as a notification mode DB 13*e*.

In the notification mode DB 13*e*, information indicating the type of the state of the user (hereinafter referred to as "user state type information") and information indicating a mode of a notification to be executed corresponding to the state ("notification mode information") are stored in association with each other. For example, in a case where the notification sound is made larger in a case where the user has a hearing impairment than in a case where the user does not have a hearing impairment, in the notification mode DB 13*e*, information indicating a "person having a hearing impairment" and information indicating a "person not having a hearing impairment" are stored as the user state type information, notification mode information indicating a "notification with a large volume" is stored in association with the former user state type information, and notification mode information indicating a "notification with a small volume" is stored in association with the latter user state type information. Furthermore, in a case where the notification by vibration is performed in a case where the user has a hearing impairment and the notification by sound is performed in a case where the user does not have a hearing impairment, in the notification mode DB 13*e*, similarly, information indicating a "person having a hearing impairment" and information indicating a "person not having a hearing impairment" are stored as the user state type information, notification mode information indicating a "notification by vibration" is stored in association with the former user state type information, and notification mode information indicating a "notification by sound" is stored in association with the latter user state type information.

In the present example, it is assumed that the information as to whether or not the user of the notification device 2C has a hearing impairment is set and input in the notification device 2C in advance by the user's operation, for example. The control unit 12C performs notification control as the fourth embodiment as described above on the basis of such setting information as to whether or not the user has hearing impairment.

Figure 8:
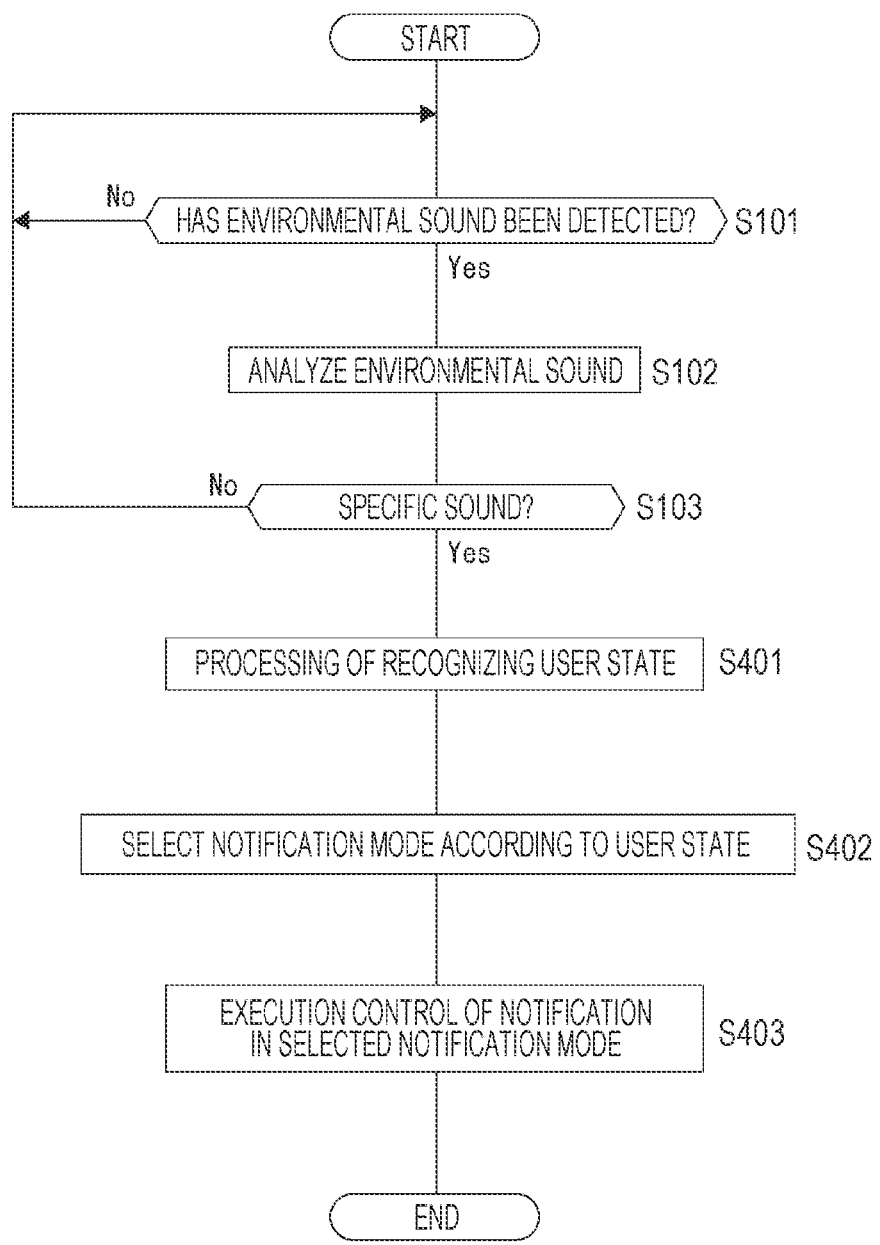
FIG. 8 is a flowchart illustrating an example of a specific processing procedure for realizing notification control as the fourth embodiment.

The flowchart of FIG. 8 illustrates an example of a specific processing procedure for realizing notification control as the fourth embodiment.

For example, the processing illustrated in FIG. 8 is executed by the control unit 12C (CPU) on the basis of the program stored in a predetermined storage device such as a built-in ROM.

Also in this case, the processing of steps S101 to S103 is executed similarly to the case of the previous embodiments.

In a case where it is determined in step S103 that the specific sound has been detected, the control unit 12C performs processing of recognizing the user state in step S401. Specifically, in the present example, recognition as to whether or not the user has a hearing impairment is performed on the basis of the setting information as to whether or not the user has a hearing impairment.

In step S402 following step S401, the control unit 12C selects a notification mode according to the user state. That is, the corresponding notification mode is selected from the notification mode DB 13e on the basis of the user state recognized in step S401.

Then, in step S403 following step S402, the control unit 12C performs execution control of the notification by the selected notification mode. That is, the notification unit 21 illustrated in FIG. 7 is instructed to execute a notification by the selected notification mode.

The control unit 12C ends the series of processing illustrated in FIG. 8 in response to the execution of the processing of step S403.

Here, in the above description, an example has been described in which the notification is performed with a larger volume in a case where the user has a hearing impairment than in a case where the user does not have a hearing impairment on the premise of a case where the notification by sound is performed. However, the frequency may be changed instead of the volume of the notification sound depending on whether or not the user has a hearing impairment.

Furthermore, in the above description, it has been described that notification by tactile stimulation such as vibration instead of sound is performed in a case where the user has a hearing impairment. However, in a case of the user with hyperacusis, there is a possibility that an excessive sound will be perceived by the user in a case where the notification by sound is performed in a state where the sound is not blocked. Also in this sense, in a case of the user with hyperacusis, it is appropriate to perform a notification by tactile stimulation instead of sound.

Furthermore, in the above description, the state of the hearing impairment such as hearing loss and hyperacusis has been exemplified as the state of the user. However, as the state of the user, for example, a state of wearing headphones or earphones is also conceivable. Since the state in which the user wears the headphones or earphones is also a state in which it is difficult for the user to hear, it is effective to perform a notification by tactile stimulation such as vibration instead of sound.

5. Fifth Embodiment

A fifth embodiment is an example in which, assuming that a notification is given in an in-vehicle environment, a notification is performed to a user as an occupant in a case where a specific sound is detected as an environmental sound outside the vehicle, such as a siren of an emergency vehicle (for example, an ambulance or a patrol car) or a horn sound of another vehicle.

Figure 9:
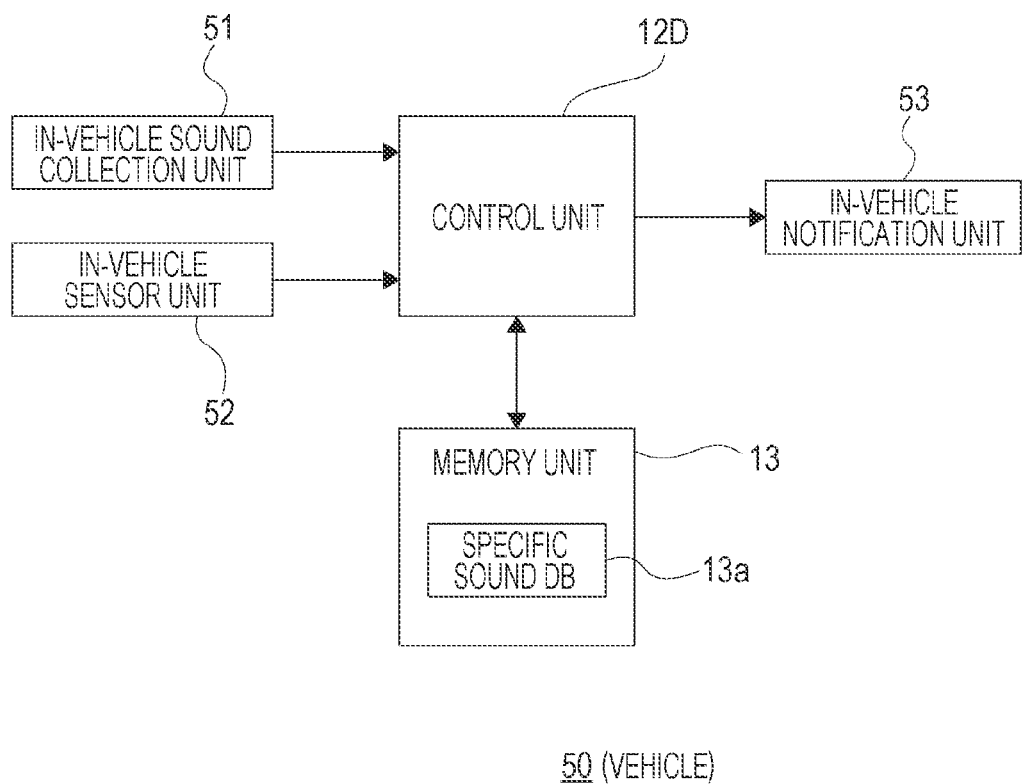
FIG. 9 is a block diagram illustrating a system configuration example of a vehicle as a fifth embodiment.

FIG. 9 is a block diagram illustrating a system configuration example of a vehicle 50 as the fifth embodiment having a function of notifying the detection of such an environmental sound outside the vehicle.

As illustrated in the drawing, the vehicle 50 includes an in-vehicle sound collection unit 51, an in-vehicle sensor unit 52, an in-vehicle notification unit 53, a control unit 12D, and the memory unit 13.

The in-vehicle sound collection unit 51 includes a microphone, and collects an environmental sound outside the vehicle. Note that, the in-vehicle sound collection unit 51 may include a microphone that collects the sound generated in the vehicle interior.

The in-vehicle sensor unit 52 comprehensively represents various sensors included in the vehicle 50. Examples of the sensor included in the in-vehicle sensor unit 52 include an image sensor that obtains a captured image of an environment outside the vehicle or an in-vehicle environment, a seating sensor that detects seating of an occupant (including a driver) on a seat in the vehicle interior, and the like.

The in-vehicle notification unit 53 is a notification unit provided in the vehicle interior. In the present example, the in-vehicle notification unit 53 is a vibration device provided on an object in contact with the user, such as a seat.

The control unit 12D causes the in-vehicle notification unit 53 to execute a notification to the user in response to the detection of the specific sound such as the siren of the emergency vehicle or the horn sound of another vehicle described above on the basis of the sound collection signal from the in-vehicle sound collection unit 51 and the specific sound DB 13a stored in the memory unit 13.

Figure 10:
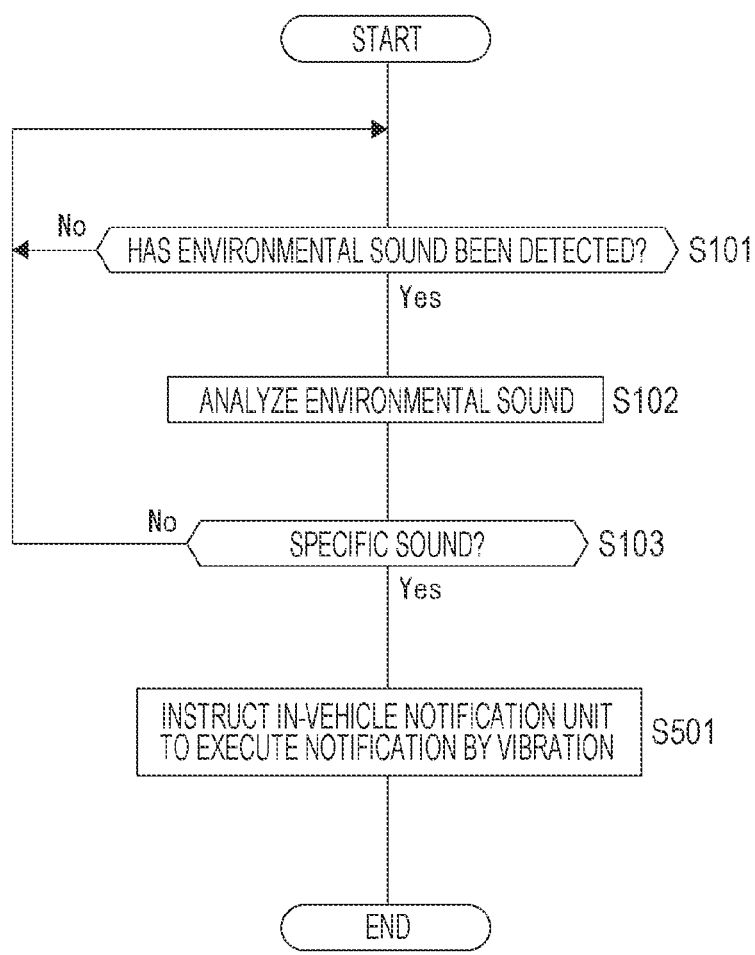
FIG. 10 is a flowchart illustrating an example of a specific processing procedure for realizing notification control as the fifth embodiment.

FIG. 10 is a flowchart illustrating an example of a specific processing procedure by the control unit 12D for realizing such notification control.

For example, the processing illustrated in FIG. 10 is executed by the control unit 12D (CPU) on the basis of the program stored in a predetermined storage device such as a built-in ROM.

Also in this case, the point that the processing of steps S101 to S103 is executed is similar to the case of the previous embodiments, and the control unit 12D instructs the in-vehicle notification unit 53 to execute the notification in step S501 in a case where it is determined in step S103 that the specific sound has been detected.

Through such a series of processing, the notification control as the fifth embodiment described above is realized.

The notification control as the fifth embodiment as described above can be applied to the vehicle 50 that performs automated driving. For example, by notifying the driver (the occupant sitting on the driver's seat) in response to the detection of the horn sound of another vehicle, it is possible to realize a quick response by manual driving.

Furthermore, even in the manual driving, for example, in a case where an occupant plays music in the vehicle so as to hardly notice a specific sound such as a siren or a horn of another vehicle, it is possible to notify the occupant of the generation of the specific sound, and it is possible to enhance the safety in vehicle operation.

Note that, in the fifth embodiment, similarly to the other embodiments, the notification mode can be controlled according to the state of the notification device or the state of the user. For example, in a case where a portable device such as a smartphone is used as the notification device, it is conceivable to control the notification mode according to the state of the notification device similarly to the example described in the first embodiment and the like. Alternatively, it is also conceivable to change the magnitude of the vibration of the notification according to the state of the occupant (user) during the automated driving. As an example, for example, it is conceivable to determine whether or not the occupant sitting on the driver's seat is in an inattentive state (for example, whether or not the occupant is in conversation with another occupant) using, for example, an image sensor or the like of the in-vehicle sensor unit 52, and to increase vibration in a case where the occupant is in an inattentive state.

Furthermore, in the fifth embodiment, in the detection processing of the specific sound, for the detection of a sound having a limited frequency band such as a sound of a siren, for example, the detection processing is performed by narrowing down the frequency band to a specific frequency band, so that a load of the detection processing can be reduced, a processing speed can be improved, and a time required from the detection to the notification of the specific sound can be shortened.

Furthermore, it may be possible to switch between a high-speed detection mode in which the frequency band is narrowed down as described above and a normal detection mode in which the frequency band is not narrowed down.

Furthermore, it is also conceivable to detect the emergency vehicle in combination with a captured image by the image sensor (for example, a captured image of the rear of the vehicle).

6. Modification

Here, the embodiment is not limited to the specific examples described above, and various configurations as modifications can be adopted.

For example, in a case where it is not possible to specify the environmental sound by referring to the specific sound DB 13*a*, the environmental sound may be recorded in the memory unit 13 or the like, for example, and be confirmed by the user. The timing at which the user is made to confirm may be, for example, a periodic timing such as once a day, or may be a timing at which an operation requesting confirmation is detected.

Furthermore, it is also conceivable to update the information content of the specific sound DB 13*a* by causing the user to input information on what sound the sound is after the user is made to confirm.

Furthermore, in the above description, as an example of the notification, a notification by sound or vibration, screen display, or lamp has been exemplified, but it is not limited thereto. For example, it is conceivable to perform a notification using a method other than vibration such as air blowing as the notification by tactile stimulation.

Furthermore, in the above description, an example has been described in which the sound collection unit that collects the environmental sound is provided only in one device. However, in a case where there is a plurality of notification devices 2 and each of the notification devices 2 has a sound collection unit, the environmental sound can be detected using the sound collection signals obtained by the notification devices 2.

By adopting such a method, it is possible to specify the sound source position of the environmental sound with high accuracy using the information on the position of each notification device 2.

Furthermore, regarding the configuration of the notification system as an embodiment, all of the detection unit of the environmental sound, the recognition unit that recognizes the state of the notification device and the state of the user, the selection unit that selects the notification mode according to the state of the notification device and the state of the user, and the notification unit that executes the notification by the selected notification mode may be implemented in the same device, may be implemented in individual devices, or may be implemented in a form in which some of the units are implemented in the same device and other units are implemented in different devices.

For example, the recognition unit described above is not limited to being provided on the notification device 2 side as in the specific examples of the first embodiment to third embodiment, and may be configured to be provided on a device other than the notification device 2, such as on the control device (1, 1A, 1B) side.

7. Summary of Embodiments

The notification control device (control device 1, 1A, 1B or notification device 2C) of the embodiments described above includes a control unit (control unit 12, 12A, 12B, 12C) that controls the notification mode by the notification device (notification device 2, 2C) that performs a notification of detection of an environmental sound, on the basis of the arrangement state of the notification device or the state of the user of the notification device.

Therefore, for example, the notification mode by the notification device is controlled on the basis of the arrangement state of the notification device, such as a state in which the notification device is arranged on the immovable object such as a sofa, or a state in which the notification device is arranged in a noisy room where a vacuum cleaner is used, or the state of the user, such as a state in which the user has hearing loss or is listening to music using headphones or the like, and thus it is possible to increase the possibility that the user notices the notification.

Accordingly, it is possible to improve the reliability of the system that notifies the user that the environmental sound has been detected.

Furthermore, in the notification control device as the embodiments, the control unit controls the notification mode on the basis of the arrangement state of the notification device with respect to the user (refer to the first embodiment to third embodiment).

Therefore, it is possible to appropriately control the notification mode according to the arrangement state of the notification device with respect to the user, such as a state in which the notification device is being held by the user or is in the pocket.

Therefore, the possibility that the user notices the notification can be increased, and the reliability of the notification system can be improved.

Moreover, in the notification control device as the embodiments, the control unit controls such that the notification mode is different between a case where the notification device is arranged in contact with the user and a case where the notification device is not arranged in contact with the user.

Therefore, it is possible to appropriately control the notification mode on the basis of whether or not the notification device is arranged in contact with the user, for example, in a case where the notification device is being held by the user or is in the pocket.

Therefore, the possibility that the user notices the notification can be increased, and the reliability of the notification system can be improved.

Furthermore, in the notification control device as the embodiments, the control unit controls such that a notification is performed in different modes between a case where the notification device is arranged on an immovable object and a case where the notification device is not arranged on the immovable object.

Therefore, the notification mode can be appropriately controlled on the basis of whether or not the notification device is arranged on the immovable object such as a sofa.

Therefore, the possibility that the user notices the notification can be increased, and the reliability of the notification system can be improved.

Furthermore, in the notification control device as the embodiments, the control unit controls such that a notification is performed in different modes between a case where the notification device is arranged at a position on a specific ear side of either a left or right ear of the user and a case where the notification device is not arranged at the position on the specific ear side of either the left or right ear of the user.

Therefore, it is possible to control the notification mode on the basis of whether or not the notification device is arranged at a position on the ear side where it is difficult for the user to hear, in response to a situation where only one ear is difficult to hear, for example, in a case where the user has hearing loss of one ear, in a case where only one ear is wearing an earphone, or the like.

Therefore, the possibility that the user notices the notification can be increased, and the reliability of the notification system can be improved.

Moreover, in the notification control device as the embodiments, regarding a notification by tactile stimulation, the control unit controls such that a notification indicating only that the environmental sound has been detected and a notification indicating a type of the detected sound are performed for detection of one environmental sound.

Regarding the notification by tactile stimulation, for the notification indicating the type of the detected sound, there is a tendency to select a tactile stimulation pattern having a relatively high resolution in order to improve discriminability of the sound type by the user, and therefore, it is difficult to select a tactile stimulation pattern having a low resolution, which is easily noticed by the user. Therefore, as described above, by separately performing the notification indicating only that the environmental sound has been detected and the notification indicating the type of the detected sound, it is possible to perform a notification of a pattern which is specialized only for the notification of detection and is easily noticed, and then perform a notification by a pattern having a high resolution for discriminating the sound type.

Therefore, the possibility that the user notices the notification can be increased, and the reliability of the notification system can be improved.

Furthermore, in the notification control device as the embodiments, there is a plurality of the notification devices, and the control unit (control unit 12A) selects the notification device to perform a notification according to a type of the detected environmental sound.

Therefore, it is possible to cause the notification device of the user, which is considered to be appropriate as the notification destination from the type of the detected environmental sound, to execute the notification.

Accordingly, it is possible to perform an efficient notification.

Furthermore, in the notification control device as the embodiments, there is a plurality of the notification devices, and the control unit selects the notification device to perform a notification according to a distance from an estimated sound source position of the detected environmental sound (refer to FIG. 4 or the like).

Therefore, for example, it is possible to cause the notification device of the user, which is considered to be appropriate in terms of ease of coping with the event indicated by the environmental sound, to execute the notification, such as performing the notification to the user located at a short distance to such an extent that the event indicated by the environmental sound, such as an event of rice cooking completion indicated by the notification sound of the rice cooker, can be coped with, for example.

Accordingly, it is possible to optimize the notification.

Moreover, in the notification control device as the embodiments, the control unit (control unit 12B) controls the notification mode according to urgency of the detected environmental sound.

By controlling the notification mode according to the urgency of the environmental sound, it is possible to perform a notification by an appropriate mode according to the urgency.

Accordingly, it is possible to optimize the notification.

Furthermore, in the notification control device as the embodiments, the control unit controls a delay time from detection to a notification of the environmental sound according to the urgency.

Therefore, for example, in a case where the urgency is high, it is possible to control the delay time to be shorter than in a case where the urgency is low, and it is possible to prevent the notification for the environmental sound with the low urgency from being given priority in terms of timing over the notification for the environmental sound with the high urgency.

Accordingly, it is possible to optimize the notification.

Furthermore, in the notification control device as the embodiments, regarding a notification by tactile stimulation, the control unit controls such that a notification is performed in a low vibration period during walking in a case where the notification device is arranged in contact with the user who is walking.

In a case where the notification device arranged in contact with the walking user performs a notification by tactile stimulation, it is possible to increase the possibility that the user notices the notification by performing the notification in the low vibration period.

Accordingly, it is possible to improve the reliability of the notification system.

Moreover, in the notification control device (notification device 2C) as the embodiments, the control unit (control unit 12C) controls the notification mode on the basis of information as to whether or not the user has a hearing impairment.

Therefore, for example, in a case where the user has a hearing impairment such as hearing loss or hyperacusis, it is possible to perform the notification by an appropriate mode according to the presence or absence of the hearing impairment of the user, such as performing the notification by tactile stimulation or visual notification instead of sound.

Accordingly, it is possible to optimize the notification.

Furthermore, a notification control method as the embodiments is a notification control method that controls a notification mode by a notification device that performs a notification of detection of an environmental sound, on a basis of an arrangement state of the notification device or a state of a user of the notification device.

Even with such a notification control method, it is possible to obtain actions and effects similar to those of the notification control device as the embodiments described above.

A notification system (notification system 100, 100A, 100B) as the embodiments is a notification system in which a notification device (notification device 2) performs a notification that a notification control device (control device 1A) has detected an environmental sound, and includes a detection unit (sound collection unit 11) that is provided in the notification control device, and detects the environmental sound; a recognition unit (control unit 22) that recognizes an arrangement state of the notification device or a state of a user of the notification device; and a control unit (control unit 12, 12A, 12B) that is provided in the notification control device, and controls a notification mode by the notification device on a basis of the arrangement state of the notification device or the state of the user recognized by the recognition unit.

Even with such a notification system, actions and effects similar to those of the notification control device as the embodiments described above are obtained.

Furthermore, in the notification system (notification system 100A) as the embodiments, there is a plurality of the notification devices, and the control unit (control unit 12A) selects the notification device to perform the notification according to a type of the environmental sound detected by the detection unit.

Therefore, it is possible to cause the notification device of the user, which is considered to be appropriate as the notification destination from the type of the detected environmental sound, to execute the notification.

Accordingly, it is possible to perform an efficient notification.

Note that, the effects described in the specification are merely examples and are not limited, and may have other effects.

8. Present Technology

The present technology can also adopt the following configurations.

(1)
A notification control device including:
a control unit that controls a notification mode by a notification device that performs a notification of detection of an environmental sound, on a basis of an arrangement state of the notification device or a state of a user of the notification device.

(2)
The notification control device described in (1), in which the control unit controls the notification mode on a basis of the arrangement state of the notification device with respect to the user.

(3)
The notification control device described in (2), in which the control unit controls such that the notification mode is different between a case where the notification device is arranged in contact with the user and a case where the notification device is not arranged in contact with the user.

(4)
The notification control device described in any of (1) to (3),
in which the control unit controls such that a notification is performed in different modes between a case where the notification device is arranged on an immovable object and a case where the notification device is not arranged on the immovable object.

(5)
The notification control device described in any of (2) to (4),
in which the control unit controls such that a notification is performed in different modes between a case where the notification device is arranged at a position on a specific ear side of either a left or right ear of the user and a case where the notification device is not arranged at the position on the specific ear side of either the left or right ear of the user.

(6)
The notification control device described in any of (1) to (5),
in which, regarding a notification by tactile stimulation, the control unit controls such that a notification indicating only that the environmental sound has been detected and a notification indicating a type of the detected sound are performed for detection of one environmental sound.

(7)
The notification control device described in any of (1) to (6),
in which there is a plurality of the notification devices, and
the control unit selects the notification device to perform a notification according to a type of the detected environmental sound.

(8)
The notification control device described in any of (1) to (7),
in which there is a plurality of the notification devices, and
the control unit selects the notification device to perform a notification according to a distance from an estimated sound source position of the detected environmental sound.

(9)
The notification control device described in any of (1) to (8),
in which the control unit controls the notification mode according to urgency of the detected environmental sound.

(10)
The notification control device described in (9), in which the control unit controls a delay time from detection to a notification of the environmental sound according to the urgency.

(11)
The notification control device described in any of (1) to (10),
in which regarding a notification by tactile stimulation, the control unit controls such that a notification is performed in a low vibration period during walking in a case where the notification device is arranged in contact with the user who is walking.

(12)
The notification control device described in any of (1) to in which the control unit controls the notification mode on a basis of information as to whether or not the user has a hearing impairment.

(13)
A notification control method including:
controlling a notification mode by a notification device that performs a notification of detection of an environmental sound, on a basis of an arrangement state of the notification device or a state of a user of the notification device.

(14)

A notification system in which a notification device performs a notification that a notification control device has detected an environmental sound, the notification system including:
  a detection unit that is provided in the notification control device, and detects the environmental sound;
  a recognition unit that recognizes an arrangement state of the notification device or a state of a user of the notification device; and
  a control unit that is provided in the notification control device, and controls a notification mode by the notification device on a basis of the arrangement state of the notification device or the state of the user recognized by the recognition unit.

(15)

The notification system described in (14),
in which there is a plurality of the notification devices, and
the control unit selects the notification device to perform the notification according to a type of the environmental sound detected by the detection unit.

REFERENCE SIGNS LIST 100, 100A, 100B Notification system
1, 1A, 1B Control device
11 Sound collection unit
12, 12A, 12B, 12C, 12D Control unit
13 Memory unit
13a Specific sound DB (database)
13b, 13e Notification mode DB
13c Notification device DB
13d Urgency DB
14 Communication unit
2, 2C Notification device
21 Notification unit
22 Control unit
23 Communication unit
24 Operation unit
25 Sensor unit
3 Network
50 Vehicle
51 In-vehicle sound collection unit
52 In-vehicle sensor unit
53 In-vehicle notification unit

The invention claimed is:

1. A notification control device, comprising:
  a detection unit configured to detect an environmental sound generated outside the notification control device; and
  a control unit configured to:
    determine whether the detected environmental sound is a specific sound;
    control transmission of an inquiry to a notification device based on a determination that the detected environmental sound is the specific sound, wherein
      the notification device is different from the notification control device,
      the notification device is connected to the notification control device via a network, and
      the inquiry is related to an arrangement state of the notification device;
    control reception of a first information from the notification device, wherein
      the first information includes a response to the inquiry or a state of a user of the notification device, and
      the response indicates the arrangement state of the notification device;
    select a notification mode of a notification of the detected environmental sound, wherein
      the notification is to be executed by the notification device, and
      the notification mode is selected based on the arrangement state of the notification device or the state of the user of the notification device; and
    instruct the notification device to execute the notification of the detected environmental sound, wherein
      the notification is executed by the notification device based on the notification mode selected based on the arrangement state of the notification device or the state of the user of the notification device.

2. The notification control device according to claim 1, wherein
  the control unit is further configured to select the notification mode based on the arrangement state of the notification device with respect to the user.

3. The notification control device according to claim 2, wherein
  the control unit is further configured to:
    instruct the notification device to execute the notification based on a first notification mode in a case where the notification device is in contact with the user; and
    instruct the notification device to execute the notification based on a second notification mode in a case where the notification device is not in contact with the user, wherein the second notification mode is different from the first notification mode.

4. The notification control device according to claim 1, wherein
  the control unit is further configured to:
    instruct the notification device to execute the notification based on a first notification mode in a case where the notification device is on an immovable object; and
    instruct the notification device to execute the notification based on a second notification mode in a case where the notification device is not on the immovable object, wherein the second notification mode is different from the first notification mode.

5. The notification control device according to claim 2, wherein
  the control unit is further configured to:
    instruct the notification device to execute the notification is based on a first notification mode in a case where the notification device is at a position on a specific ear side of either a left ear or a right ear of the user; and
    instruct the notification device to execute the notification based on a second notification mode in a case where the notification device is not at the position on the specific ear side of either the left ear or the right ear of the user, wherein the second notification mode is different from the first notification mode.

6. The notification control device according to claim 1, wherein
  based on the selected notification mode as tactile stimulation, the control unit is further configured to:

instruct the notification device to execute a first notification that only indicates that the environmental sound has been detected; and instruct the notification device to execute a second notification that indicates a type of the detected environmental sound.

7. The notification control device according to claim 1, wherein a plurality of notification devices is connected to the notification control device, the plurality of notification devices includes the notification device, the control unit is further configured to select the notification device to execute the notification from the plurality of notification devices, and the notification device to execute the notification is selected based on a type of the detected environmental sound.

8. The notification control device according to claim 1, wherein a plurality of notification devices is connected to the notification control device, the plurality of notification devices includes the notification device, the control unit is further configured to select the notification device to execute the notification from the plurality of notification devices, and the notification device to execute the notification is selected based on a distance from an estimated sound source position of the detected environmental sound.

9. The notification control device according to claim 1, wherein the control unit is further configured to select the notification mode based on an urgency of the detected environmental sound.

10. The notification control device according to claim 9, wherein the control unit is further configured to control a delay time from the detection of the environmental sound to the notification of the environmental sound based on the urgency.

11. The notification control device according to claim 1, wherein based on the selected notification mode as tactile stimulation, the control unit is further configured to instruct the notification device to execute the notification in a low vibration period during walk in a case where the notification device is in contact with the user who walks.

12. The notification control device according to claim 1, wherein the control unit is further configured to select the notification mode based on second information that indicates whether the user has a hearing impairment.

13. A notification control method, comprising:

detecting an environmental sound generated outside a notification control device;

determining whether the detected environmental sound is a specific sound;

controlling transmission of an inquiry to a notification device based on a determination that the detected environmental sound is the specific sound, wherein the notification device is different from the notification control device, the notification device is connected to the notification control device via a network, and the inquiry is related to an arrangement state of the notification device;

controlling reception of an information from the notification device, wherein the information includes a response to the inquiry or a state of a user of the notification device, and the response indicates the arrangement state of the notification device;

selecting a notification mode of a notification of the detected environmental sound, wherein the notification is to be executed by the notification device, and the notification mode is selected based on the arrangement state of the notification device or the state of the user of the notification device; and instructing the notification device to execute the notification of the detected environmental sound, wherein the notification is executed by the notification device based on the notification mode selected based on the arrangement state of the notification device or the state of the user of the notification device.

14. A notification system, comprising:

a notification device that comprises a first control unit configured to recognize an arrangement state of the notification device or a state of a user of the notification device; and a notification control device connected to the notification device via a network, wherein the notification device is different from the notification control device, and the notification control device comprises:

a detection unit configured to detect an environmental sound generated outside the notification control device; and a second control unit configured to:

determine whether the detected environmental sound is a specific sound;

control transmission of an inquiry to the notification device based on a determination that the detected environmental sound is the specific sound, wherein the inquiry is related to the arrangement state of the notification device recognized by the first control unit;

control reception of an information from the notification device, wherein the information includes a response to the inquiry or the state of the user of the notification device, and the response indicates the arrangement state of the notification device;

select a notification mode of a notification of the detected environmental sound, wherein the notification is to be executed by the notification device, and the notification mode is selected based on the arrangement state of the notification device or the state of the user of the notification device; and instruct the notification device to execute the notification of the detected environmental sound, wherein the first control unit of the notification device is configured to execute the notification based on the notification mode selected by the notification control device based on the arrangement state of the notification device or the state of the user.

15. The notification system according to claim 14, further comprising
   a plurality of notification devices, wherein
      the plurality of notification devices includes the notification device,
      the second control unit is further configured to select the notification device to execute the notification from the plurality of notification devices, and
      the notification device to execute the notification is selected based on a type of the environmental sound detected by the detection unit.

* * * * *